United States Patent
Chen

(10) Patent No.: US 9,874,764 B2
(45) Date of Patent: Jan. 23, 2018

(54) ZOOM LENS

(71) Applicants: Sintai Optical (Shenzhen) Co., Ltd., Shenzhen, Guandong Province (CN); Asia Optical International Ltd., Tortola (GB)

(72) Inventor: Ming-Chung Chen, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 2 days.

(21) Appl. No.: 14/829,681

(22) Filed: Aug. 19, 2015

(65) Prior Publication Data

US 2016/0054548 A1 Feb. 25, 2016

(30) Foreign Application Priority Data

Aug. 22, 2014 (TW) .............................. 103128923 A

(51) Int. Cl.
*G02B 27/64* (2006.01)
*G02B 15/173* (2006.01)

(52) U.S. Cl.
CPC .......... *G02B 27/646* (2013.01); *G02B 15/173* (2013.01)

(58) Field of Classification Search
CPC ...... G02B 27/64; G02B 27/646; G02B 15/14; G02B 15/15; G02B 15/16–15/173; G02B 15/20; G02B 9/00; G02B 9/12; G02B 9/14; G02B 9/34; G02B 9/60; G02B 9/62; G02B 9/64; H04N 5/23264; H04N 5/2328; H04N 5/23287; G03B 2205/0007; G03B 2205/0015; G03B 2205/0023; G03B 2205/0046
See application file for complete search history.

(56) References Cited

U.S. PATENT DOCUMENTS 5,828,499 A * 10/1998 Ohtake ................ G02B 15/173
359/554
5,946,145 A * 8/1999 Ohtake .................. G02B 15/17
359/763

(Continued)

*Primary Examiner* — Derek S Chapel
*Assistant Examiner* — Adam W Booher
(74) *Attorney, Agent, or Firm* — McClure, Qualey & Rodack, LLP

(57) ABSTRACT

A zoom lens, in sequence from an object side to an image side along an optical axis, comprises a first lens group; a second lens group; a stop; and a rear lens group and comprising a third lens group, a fourth lens group, and a fifth lens group; the fourth lens group further comprises an image correction lens which is able to shifted in a direction transverse to the optical axis of the zoom lens to stabilize the picked-up image when the zoom lens vibrates; furthermore, the zoom lens satisfies the following condition: $(1-\beta_p) \times \beta_r > 2$, where $\beta_p$ is a lateral magnification of the image correction lens when the zoom lens is at the telephoto end, and where $\beta_r$ is a lateral magnification of the lenses in the rear lens group except for the lenses in front of the image correction lens when the zoom lens is at the telephoto end.

14 Claims, 27 Drawing Sheets

(56) References Cited

U.S. PATENT DOCUMENTS

| | | | | |
|---|---|---|---|---|
| 7,177,092 B2 * | 2/2007 | Satori | ............... | G02B 15/173 |
| | | | | 359/676 |
| 2005/0083584 A1 * | 4/2005 | Ito | ............... | G02B 27/646 |
| | | | | 359/687 |
| 2014/0300782 A1 * | 10/2014 | Kimura | ............... | G02B 15/163 |
| | | | | 348/240.3 |

* cited by examiner

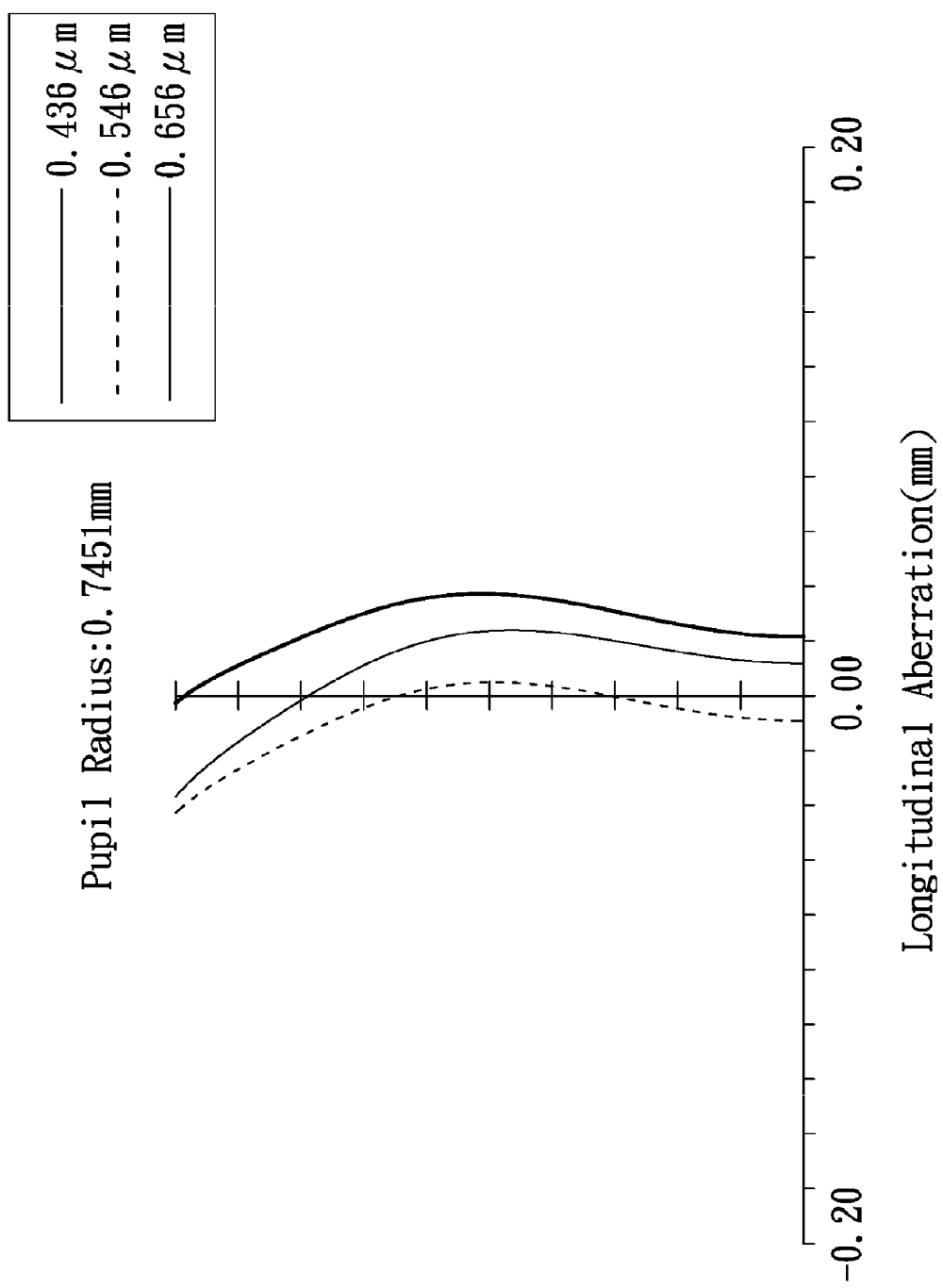

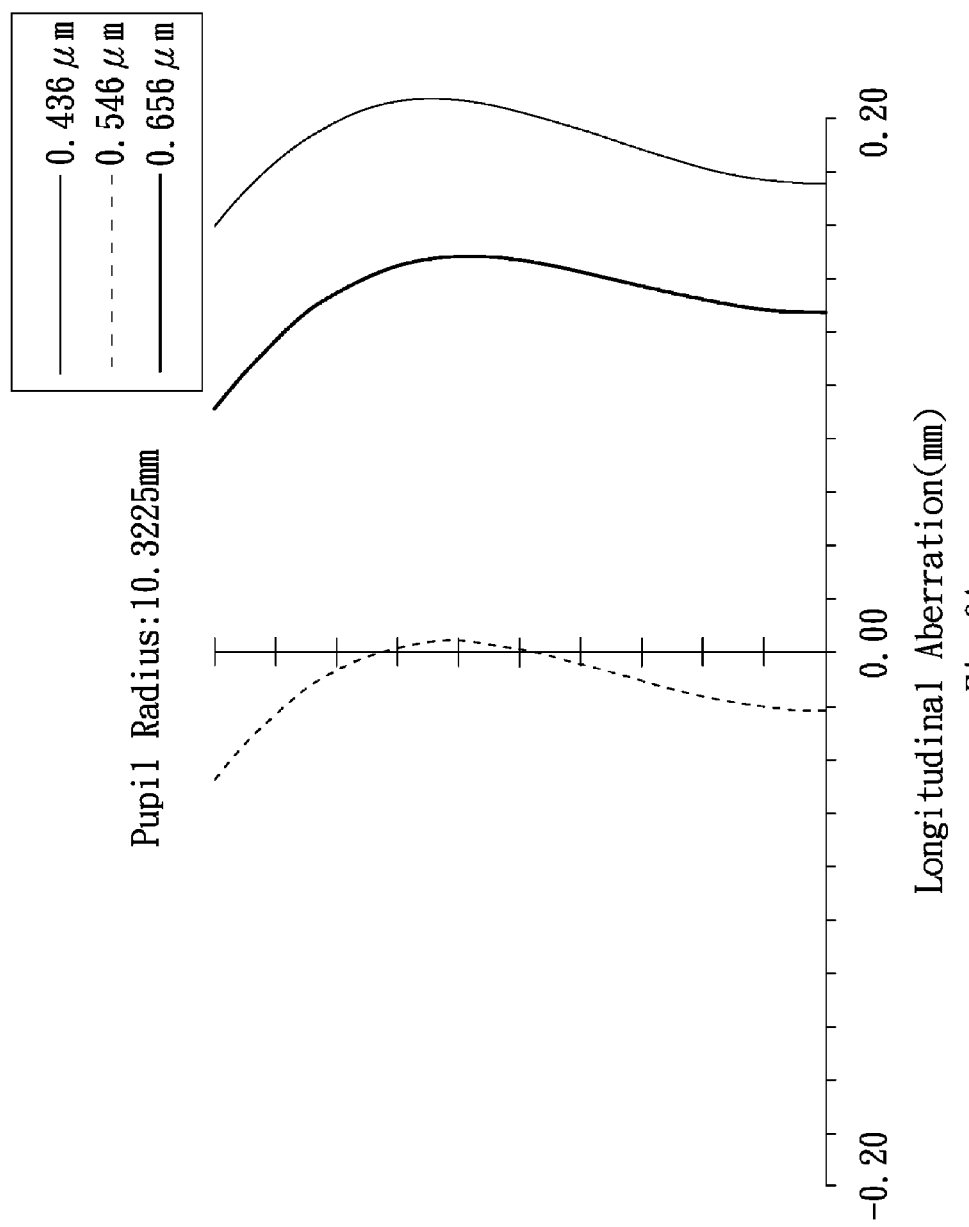

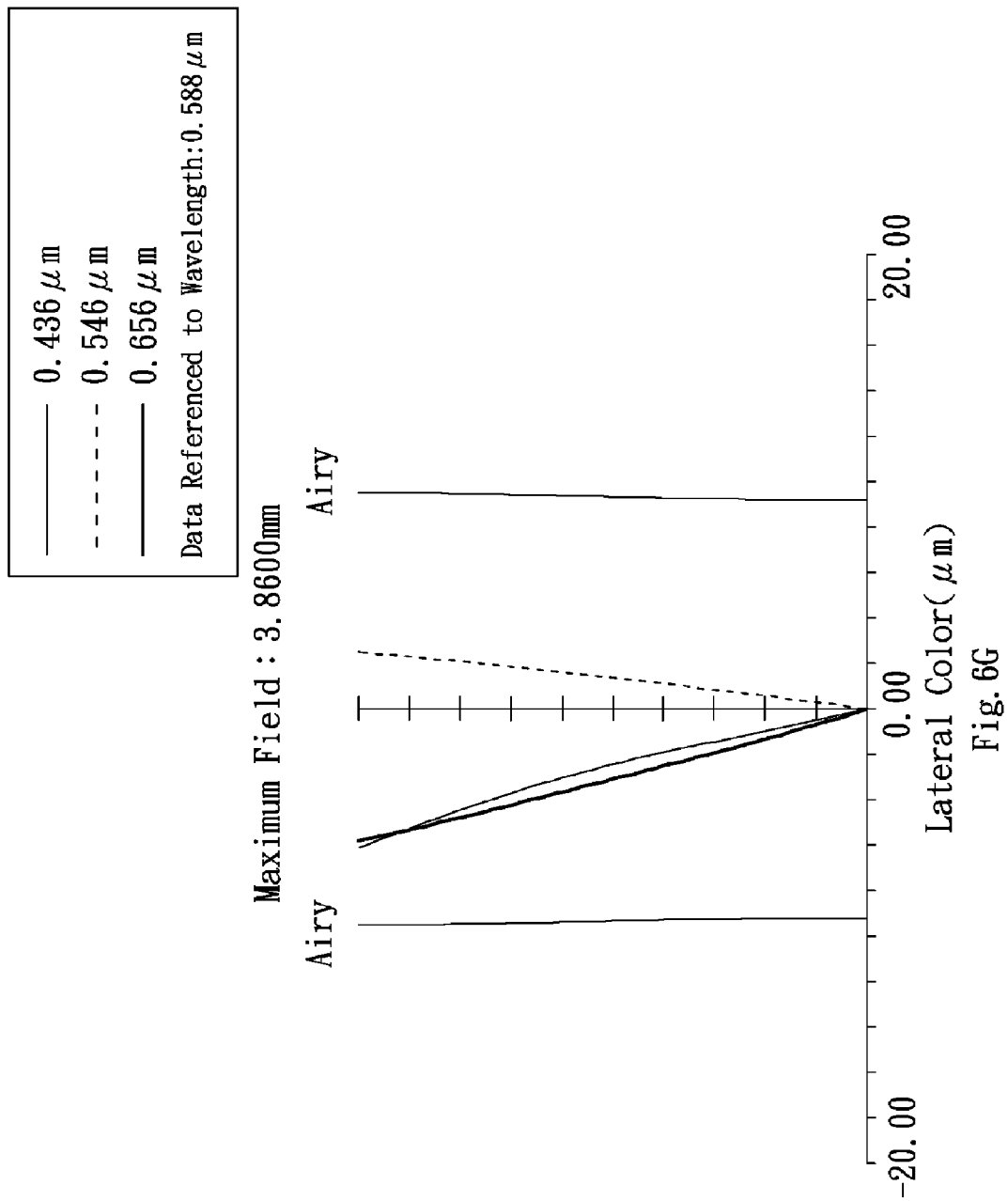

ZOOM LENS

BACKGROUND OF THE INVENTION

Field of the Invention

The invention relates to a zoom lens, and more particularly to a zoom lens having high zoom ratio.

Description of the Related Art

The conventional digital cameras almost have the zoom lens, depending on different applications of needs, and the zoom lens has become to the high magnification zoom gradually. However, at the high magnification zoom, the zoom lens is not easy to achieve the high resolution. In addition, the zoom lens with high zoom ratio easily results in image blur because of shake or vibration during handheld still image shooting.

BRIEF SUMMARY OF THE INVENTION

The invention provides a zoom lens to solve the above problems. The zoom lens has the functions of high magnification zoom and anti-vibration without deteriorating its optical performance.

The zoom lens in accordance with the invention, in sequence from an object side to an image side along an optical axis, comprises a first lens group having positive refractive power; a second lens group having negative refractive power; a stop; and a rear lens group having positive refractive power and comprising a third lens group, a fourth lens group having positive refractive power and a fifth lens group having negative refractive power. The fourth lens group further comprises an image correction lens which is able to shifted in a direction transverse to the optical axis of the zoom lens to stabilize the picked-up image when the zoom lens vibrates. Furthermore, the zoom lens satisfies the following condition: $(1-\beta_p) \times \beta_r > 2$, where $\beta_p$ is a lateral magnification of the image correction lens when the zoom lens is at the telephoto end, and where $\beta_r$ is a lateral magnification of the lenses in the rear lens group except for the lenses in front of the image correction lens when the zoom lens is at the telephoto end.

In accordance with the invention, the image correction lens has positive refractive power, wherein the image correction lens moving in a direction perpendicular to the optical axis in order to correct an image position when the zoom lens is shooting.

In accordance with the invention, the fourth lens group comprises a tenth lens and a thirteenth lens. The tenth lens has positive refractive power and the tenth lens is located in front of the object side of the image correction lens. The thirteenth lens has negative refractive power and the thirteenth lens is located in the back of the image side of the image correction lens.

In accordance with the invention, the first lens group comprises a first lens having negative refractive power, a second lens having positive refractive power, a third lens having positive refractive power and a fourth having positive refractive power. The second lens group comprises a fifth lens having negative refractive power, a sixth lens having negative refractive power, a seventh lens having positive refractive power and a eighth having negative refractive power. The third lens group has positive refractive power and comprises a ninth lens having positive refractive power. The fourth lens group has a front subgroup having positive refractive power and a rear subgroup having negative refractive power. Moreover, when the zoom lens zooms from wide-angle end to telephoto end, the first lens group and the fourth lens group move toward the object side along the optical axis, and the second lens group moves toward the image side along the optical axis.

In accordance with the invention, the fifth lens group moves toward the image side along the optical axis when the zoom lens focuses subject at close range.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4A is a longitudinal aberration diagram of a zoom lens at wide-angle end in accordance with the first embodiment of the invention;

FIG. 6A is a longitudinal aberration diagram of a zoom lens at telephoto end in accordance with the first embodiment of the invention;

FIG. 6G is a lateral color diagram of a zoom lens at telephoto end in accordance with the first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
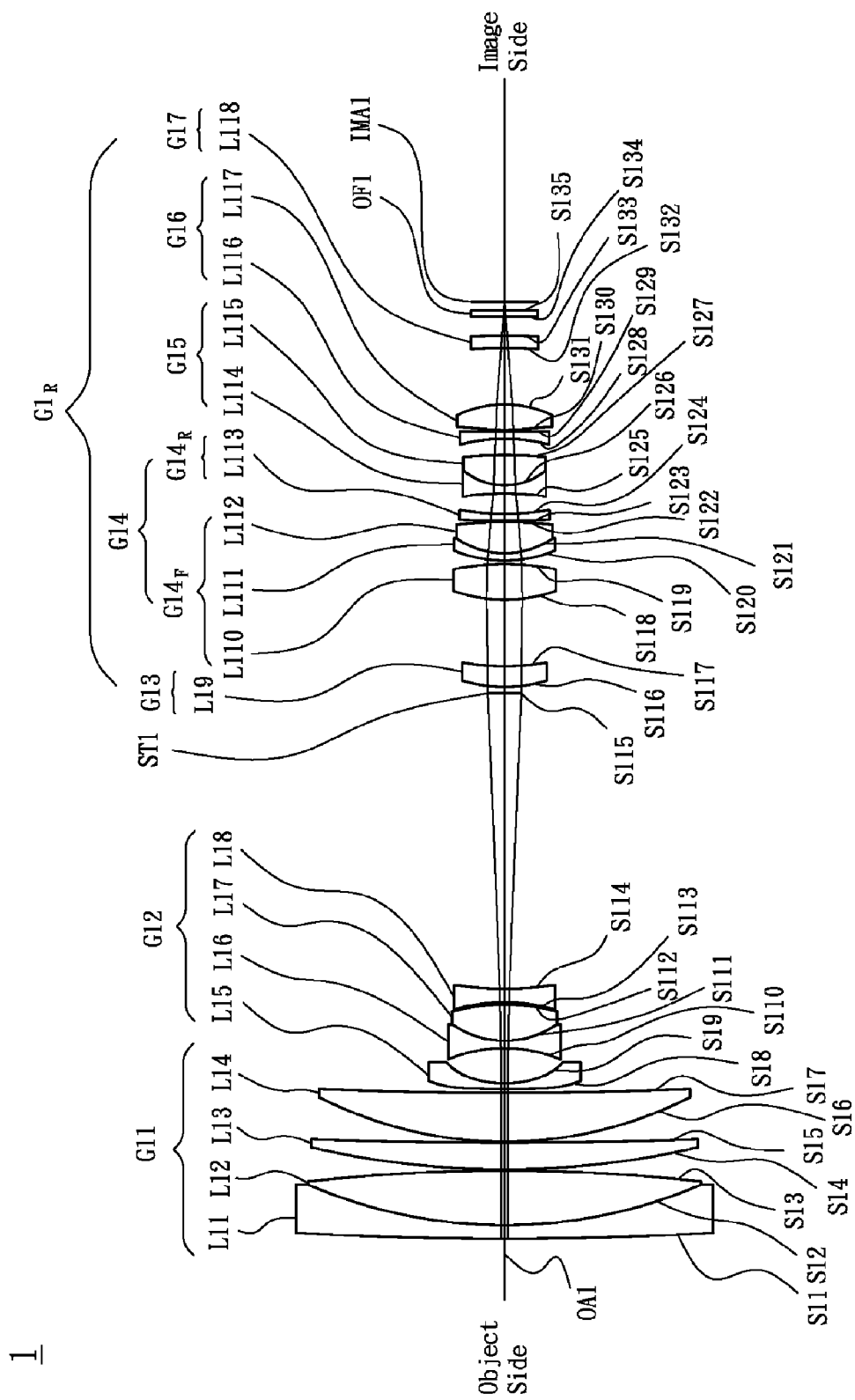
FIG. 1 is a lens layout and optical path diagram of a zoom lens at wide-angle end in accordance with a first embodiment of the invention.
Figure 2:
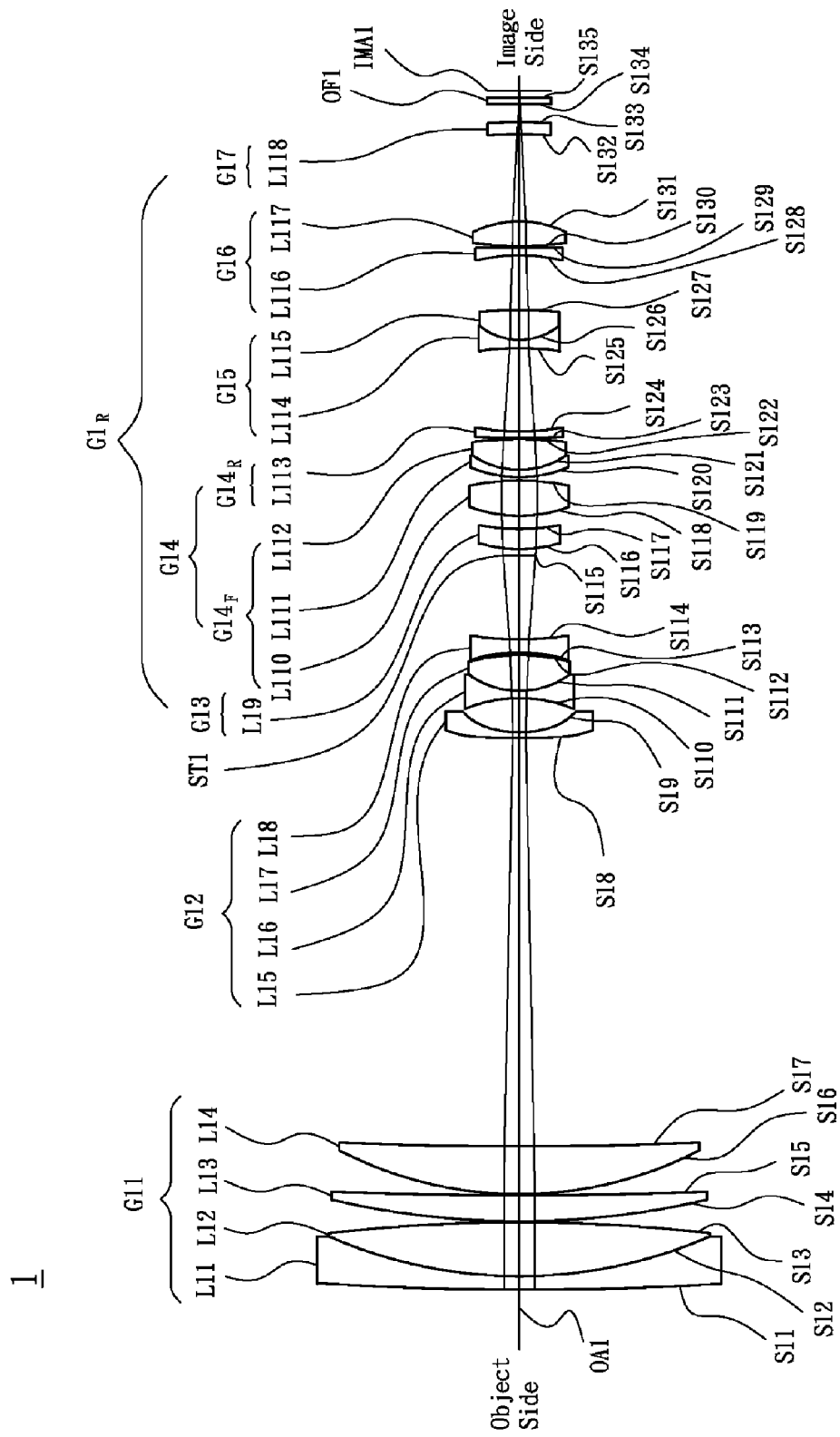
FIG. 2 is a lens layout and optical path diagram of a zoom lens at medium end in accordance with the first embodiment of the invention.
Figure 3:
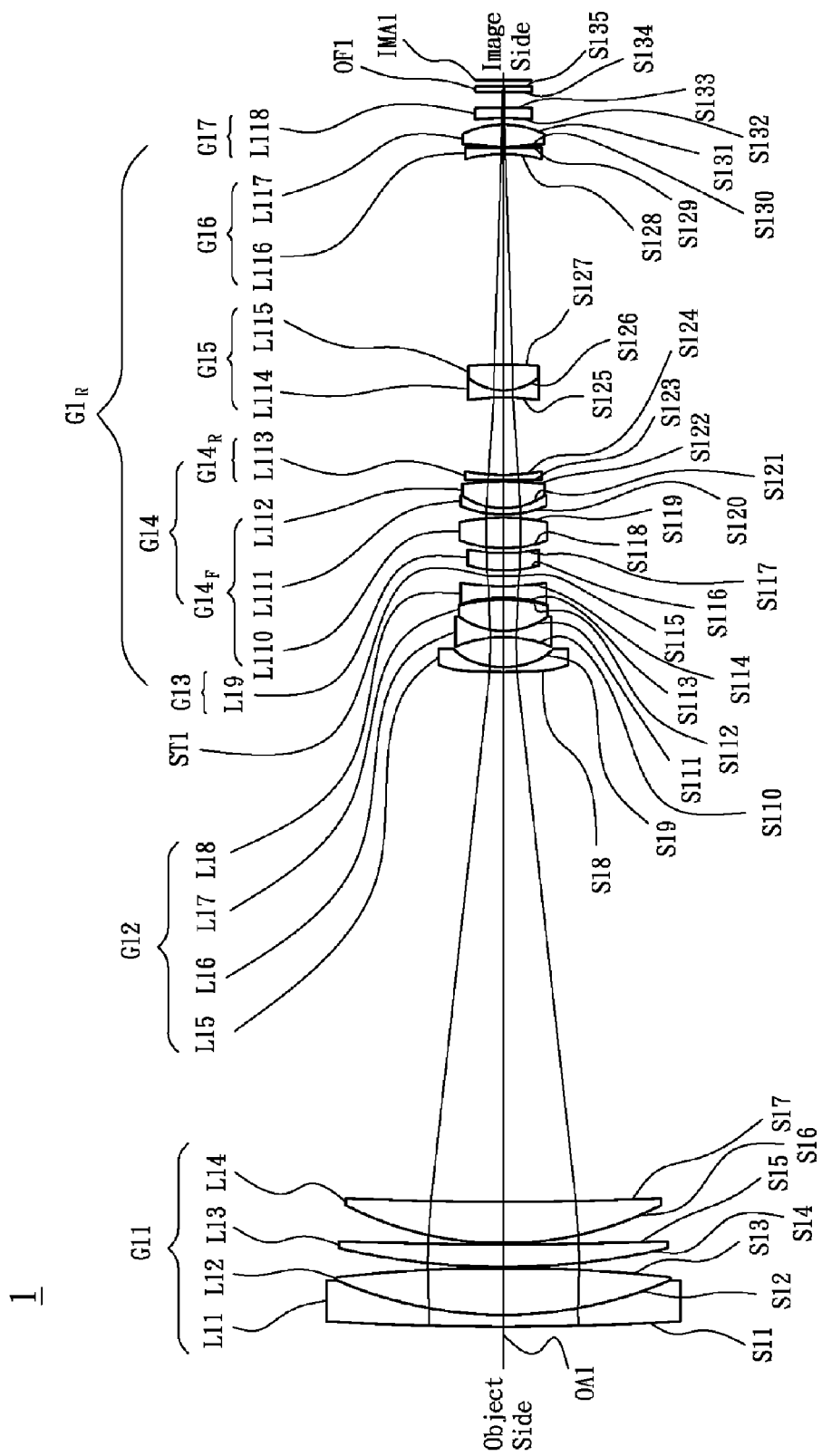
FIG. 3 is a lens layout and optical path diagram of a zoom lens at telephoto end in accordance with the first embodiment of the invention.

Referring to FIG. 1, FIG. 2 and FIG. 3, FIG. 1 is a lens layout and optical path diagram of a zoom lens at wide-angle end in accordance with a first embodiment of the invention, FIG. 2 is a lens layout and optical path diagram of a zoom lens at medium end in accordance with the first embodiment of the invention and FIG. 3 is a lens layout and optical path diagram of a zoom lens at telephoto end in accordance with the first embodiment of the invention. The zoom lens 1, in sequence from an object side to an image side along an optical axis OA1, comprises a first lens group G11 having positive refractive power; a second lens group G12 having negative refractive power; a stop ST1; and a rear lens group $G1_R$ having positive refractive power and an optical filter OF1. In operation, an image of light rays from the object side is formed at an image plane IMA1.

In the first embodiment of the zoom lens 1, the first lens group G11 comprises a first lens L11, a second lens L12, a third lens L13 and a fourth lens L14. The first lens L11 is a meniscus negative lens. The object side S11 of the first lens L11 is a spherical convex surface, and the image side S12 of the first lens L11 is a spherical concave surface. The second lens L12 is a bi-convex positive lens. The second lens L12 has an object side surface S12 and an image side surface S13, and both of which are spherical. The third lens L13 is a meniscus positive lens. The object side S14 of the third lens L13 is a spherical convex surface, and the image side S15 of the third lens L13 is a spherical concave surface. The fourth lens L14 is a meniscus positive lens. The object side S16 of the fourth lens L14 is a spherical convex surface, and the image side S17 of the fourth lens L14 is a spherical concave surface.

The second lens group G12 comprises a fifth lens L15, a sixth lens L16, a seventh lens L17 and an eighth lens L18. The fifth lens L15 is a meniscus negative lens. The object side S18 of the fifth lens L15 is an aspherical convex surface, and the image side S19 of the fifth lens L15 is an aspherical concave surface. The sixth lens L16 is a bi-concave negative lens. The sixth lens L16 has an object side surface S110 and an image side surface S111, and both of which are spherical. The seventh lens L17 is a bi-convex positive lens. The seventh lens L17 has an object side surface S111 and an image side surface S112, and both of which are spherical. The eighth lens L18 is a bi-concave negative lens. The object side S113 of the eighth lens L18 is an aspherical surface, and the image side S114 of the eighth lens L18 is a spherical surface.

The rear lens group $G1_R$ comprises a third lens group G13 having positive refractive power, a fourth lens group G14 having positive refractive power, a fifth lens group G15 having negative refractive power, a sixth lens group G16 and a seventh lens G17.

The third lens group G13 comprises a ninth lens L19 and the ninth lens L19 is a meniscus positive lens. Furthermore, the object side S116 of the ninth lens L19 is an aspherical convex surface, and the image side S117 of the ninth lens L19 is a spherical concave surface.

The fourth lens group G14 comprises a front subgroup $G14_F$ having positive refractive power and a rear subgroup $G14_R$ having negative refractive power. The front subgroup $G14_F$ comprises a tenth lens L110 and an image correction lens. In the first embodiment of the invention, the image correction lens comprises a front image correction lens L111 and a rear image correction lens L112. The tenth lens L110 is a bi-convex positive lens. The tenth lens L110 has an object side surface S118 and an image side surface S119, and both of which are aspherical. The front image correction lens L111 and the rear image correction lens L112 adhere to each other, and are shifted together in a direction transverse to the optical axis OA1 to stabilize a picked-up image when the zoom lens 1 vibrates. The rear subgroup $G14_R$ comprises a thirteenth lens L113 and the thirteenth lens L113 is a meniscus negative lens. The object side S123 of the thirteenth lens L113 is a spherical convex surface, and the image side S124 of the thirteenth lens L113 is a spherical concave surface.

The fifth lens group G15 comprises a fourteenth lens L114 and a fifteenth lens L115. The object side S125 of the fourteenth lens L114 is an aspherical concave surface, and the image side S127 of the fifteenth lens L115 is a spherical convex surface.

The sixth lens group G16 comprises a sixteenth lens L116 and a seventeenth lens L117. The sixteenth lens L116 is a meniscus lens. The object side S128 of the sixteenth lens L116 is a spherical concave surface, and the image side S129 of the sixteenth lens L116 is a spherical convex surface. The seventeenth lens L117 is a bi-convex lens. The object side S130 of the seventeenth lens L117 is an aspherical surface, and the image side S131 of the seventeenth lens L117 is a spherical concave surface.

The seventh lens group G17 comprises an eighteenth lens L118. The eighteenth lens L118 is a meniscus lens. The object side S132 of the eighteenth lens L118 is a spherical concave surface, and the image side S133 of the eighteenth lens L118 is a spherical convex surface.

The optical filter OF1 is a glass plate. The optical filter OF1 has an object side surface S134 and an image side surface S135, and both of which are plane.

Referring to FIG. 1, FIG. 2 and FIG. 3, when the zoom lens 1 zooms from wide-angle end to telephoto end, the first lens group G11, the fourth lens group G14 and the fifth lens group G15 move toward the object side along the optical axis OA1, and the second lens group G12 moves toward the image side along the optical axis OA1.

In addition, the zoom lens 1 of the first embodiment satisfies the following condition:

$$(1-\beta_p) \times \beta_r > 2 \qquad (1)$$

Where $\beta_p$ is a lateral magnification of the image correction lens when the zoom lens 1 is at the telephoto end, and where $\beta_r$ is a lateral magnification of the lenses in the rear lens group $G1_R$ except for the lenses in front of the image correction lens when the zoom lens 1 is at the telephoto end. In the first embodiment of the invention, $\beta_r$ is a lateral magnification of the front image correction lens L111, the rear image correction lens L112, the thirteenth lens L113, the fourteenth lens L114, the fifteenth lens L115, the sixteenth lens L116, the seventeenth lens L117 and the eighteenth lens L118.

In accordance with the above design of the first embodiment, the zoom lens 1 has the functions of high zoom ratio and anti-vibration without deteriorating its optical performance.

Referring to TABLE 1, the optical specifications of the zoom lens 1 of the first embodiment at the wide-angle (W), the medium end (M) and the telephoto end (T).

TABLE 1

| Surface | Radius of Curvature (mm) | Thickness (mm) | Nd | Vd | Remark |
|---|---|---|---|---|---|
| S11 | 462.518 | 1.5 | 1.83481 | 42.7238 | The first lens L11 of first lens group G11 |
| S12 | 62.25 | 6.0022 | 1.497 | 81.5409 | The second lens L12 of first lens group G11 |
| S13 | −222.581 | 0.13 | | | |
| S14 | 108.669 | 2.91674 | 1.497 | 81.5409 | The third lens L13 of first lens group G11 |
| S15 | 692.62 | 0.12 | | | |
| S16 | 51.1658 | 5.34351 | 1.497 | 81.5409 | The fourth lens L14 of first lens group G11 |
| S17 | 559.187 | 0.45(W) 45.63(M) 68.01(T) | | | |
| S18 | 133.005 | 0.6 | 1.8043 | 40.4169 | The fifth lens L15 of second lens group G12 |
| S19 | 12.5564 | 3.86136 | | | |
| S110 | −18.2554 | 0.8 | 1.883 | 40.7651 | The sixth lens L16 of second lens group |
| S111 | 11.2246 | 3.99247 | 1.8081 | 22.7608 | The seventh lens L17 of second lens group G12 |
| S112 | −25.1445 | 0.27165 | | | |
| S113 | −21.4595 | 1.46155 | 1.53504 | 55.7107 | The eighth lens L18 of second lens group G12 |
| S114 | 40.3463 | 32.43(W) 9.39(M) 1.30(T) | | | |
| S115 | ∞ | 0.7 | | | Stop ST1 |
| S116 | 17.6778 | 2.27677 | 1.53504 | 55.7107 | The ninth lens L19 of third lens group G13 |
| S117 | 30.4894 | 7.29(W) 1.46(M) 0.60(T) | | | |
| S118 | 20.0958 | 3.92447 | 1.48749 | 70.2362 | The tenth lens L10 of fourth lens group G14 |
| S119 | −28.2106 | 0.3998 | | | |
| S120 | 17.0333 | 0.80008 | 1.84666 | 23.7798 | The front image correction lens L111 of fourth lens group G14 |
| S121 | 10.8294 | 3.43833 | 1.58913 | 61.496 | The rear image correction lens L112 of fourth lens group G14 |
| S122 | −40.1446 | 0.14925 | | | |
| S123 | 235.976 | 0.69975 | 1.903658 | 31.315 | The thirteenth lens L113 of fourth lens group G14 |
| S124 | 32.6217 | 2.26(W) 9.33(M) 9.96(T) | | | |
| S125 | −30.596 | 0.89522 | 1.8043 | 40.4169 | The fourteenth lens L114 of fifth lens group G15 |
| S126 | 8.12631 | 3.32313 | 1.69895 | 30.1279 | The fifteenth lens L115 of fifth lens group G15 |
| S127 | −58.0191 | 1.76(W) 6.11(M) 26.95(T) | | | |
| S128 | −22.7349 | 0.84402 | 1.84666 | 23.7798 | The sixteenth lens L116 of sixth lens group G16 |

TABLE 1-continued

| Surface | Radius of Curvature (mm) | Thickness (mm) | Nd | Vd | Remark |
|---|---|---|---|---|---|
| S129 | −1006.27 | 0.12996 | | | |
| S130 | 26.8661 | 2.80967 | 1.53504 | 55.7107 | The seventeenth lens L117 of sixth lens group G16 |
| S131 | −13.7388 | 6.23(W) 9.72(M) 0.84(T) | | | |
| S132 | −53.0853 | 1.33 | 1.53504 | 55.7107 | The eighteenth lens L118 of seventh lens group G17 |
| S133 | −109.749 | 2.02763 | | | |
| S134 | ∞ | 7.20E−01 | 1.51633 | 64.142 | Optical filter OF1 |
| S135 | ∞ | 1.0 | | | |

The aspheric surface sag z of each lens in TABLE 1 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the zoom lens 1 of the first embodiment, the conic constant k and the aspheric coefficients A, B, C, D and E of each surface are shown in TABLE 2.

TABLE 2

| Surface | k | A | B | C | D | E |
|---|---|---|---|---|---|---|
| S18 | −564.827 | −1.9E−08 | 1.3E−11 | 0 | 0 | 0 |
| S19 | −8.37075 | 5.7E−07 | 1.4E−10 | 0 | 0 | 0 |
| S113 | 0 | 6.8E−08 | 7.8E−12 | 0 | 0 | 0 |
| S116 | 0 | −2E−08 | 3.2E−11 | 0 | 0 | 0 |
| S118 | 0 | 3.7E−08 | 0 | 0 | 0 | 0 |
| S119 | 0 | 6.8E−08 | 0 | 0 | 0 | 0 |
| S122 | 0 | −1.5E−07 | −1.5E−11 | 0 | 0 | 0 |
| S125 | 0 | −1.8E−07 | 0 | 0 | 0 | 0 |
| S130 | 0 | 1.9E−07 | 0 | 0 | 0 | 0 |

For the zoom lens 1 of the first embodiment, the $\beta_p$ is 0.227, the $\beta_r$ is 3.159. According to the above data, the following values can be obtained: $(1-\beta_p) \times \beta_r = 2.44$, which satisfy the above condition (1).

Figure 4B:
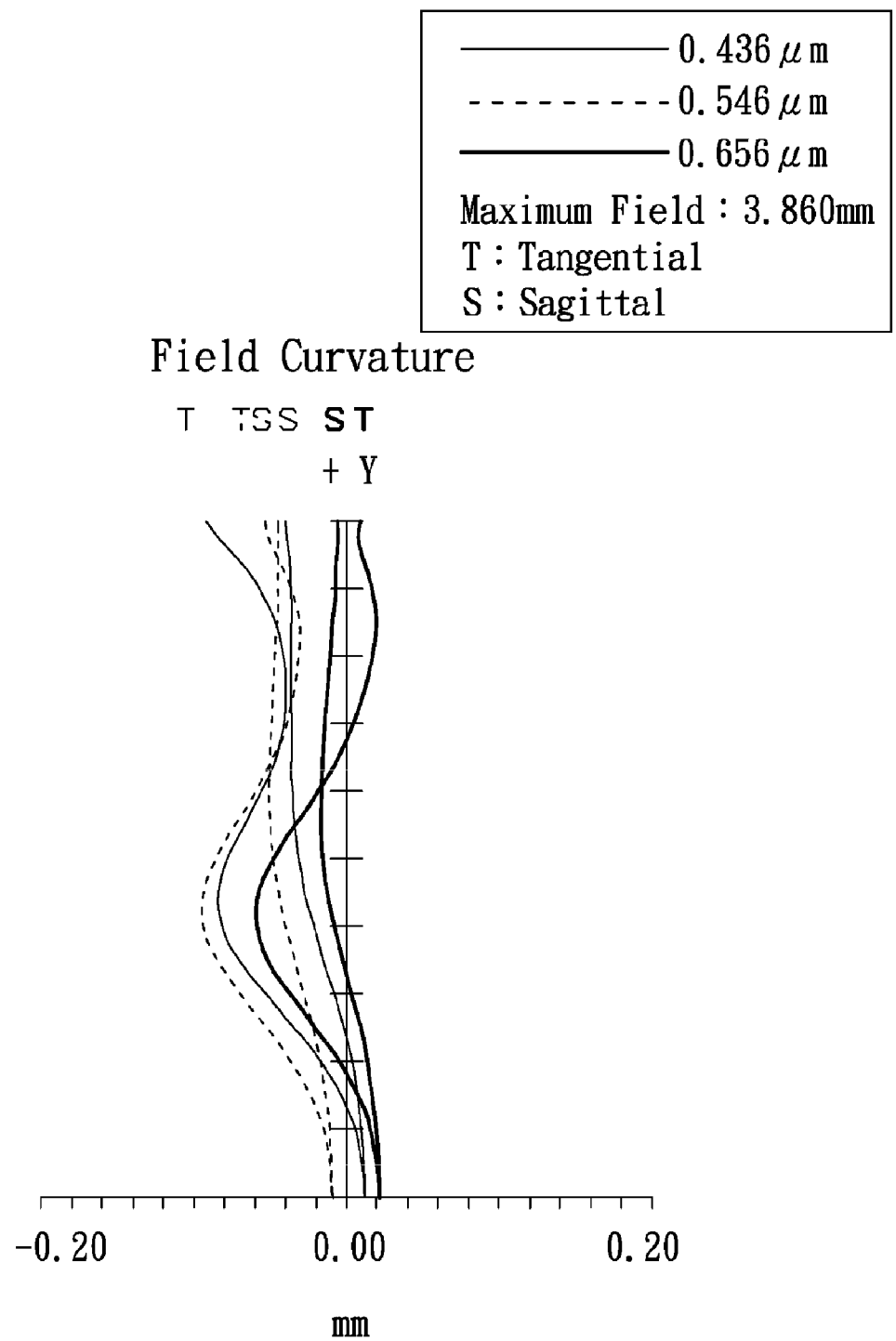
FIG. 4B is a field curvature diagram of a zoom lens at wide-angle end in accordance with the first embodiment of the invention.
Figure 4C:
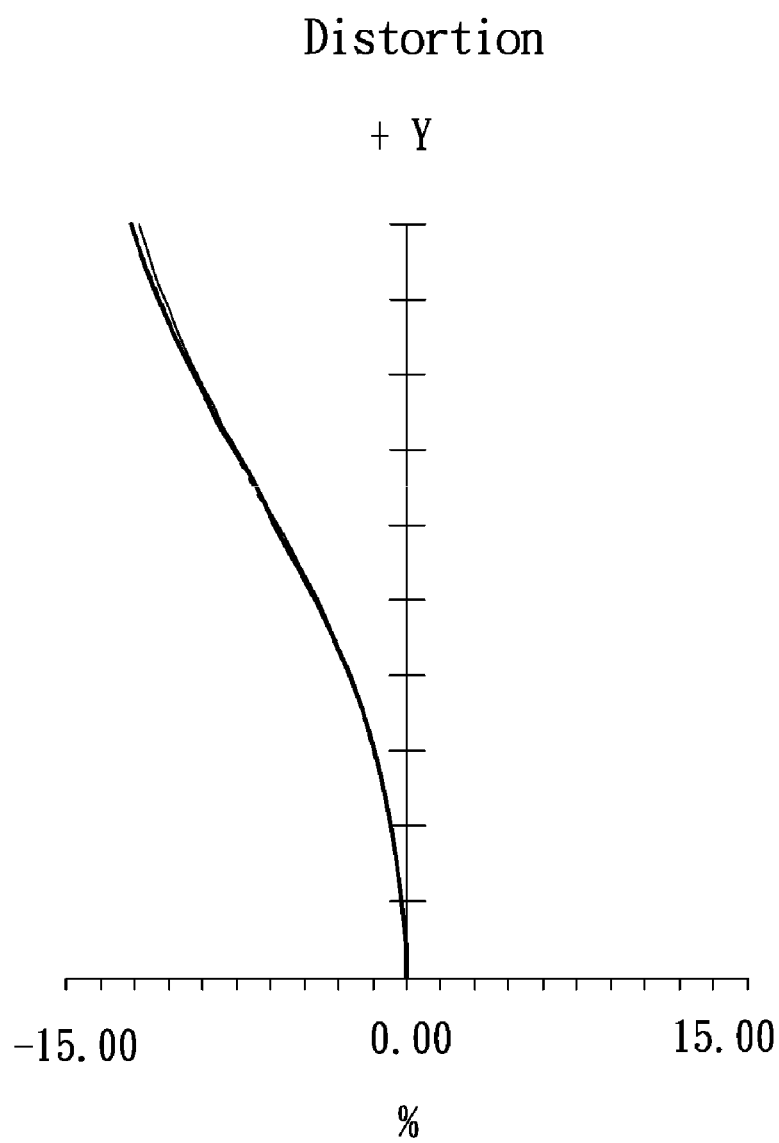
FIG. 4C is a distortion diagram of a zoom lens at wide-angle end in accordance with the first embodiment of the invention.
Figure 4D:
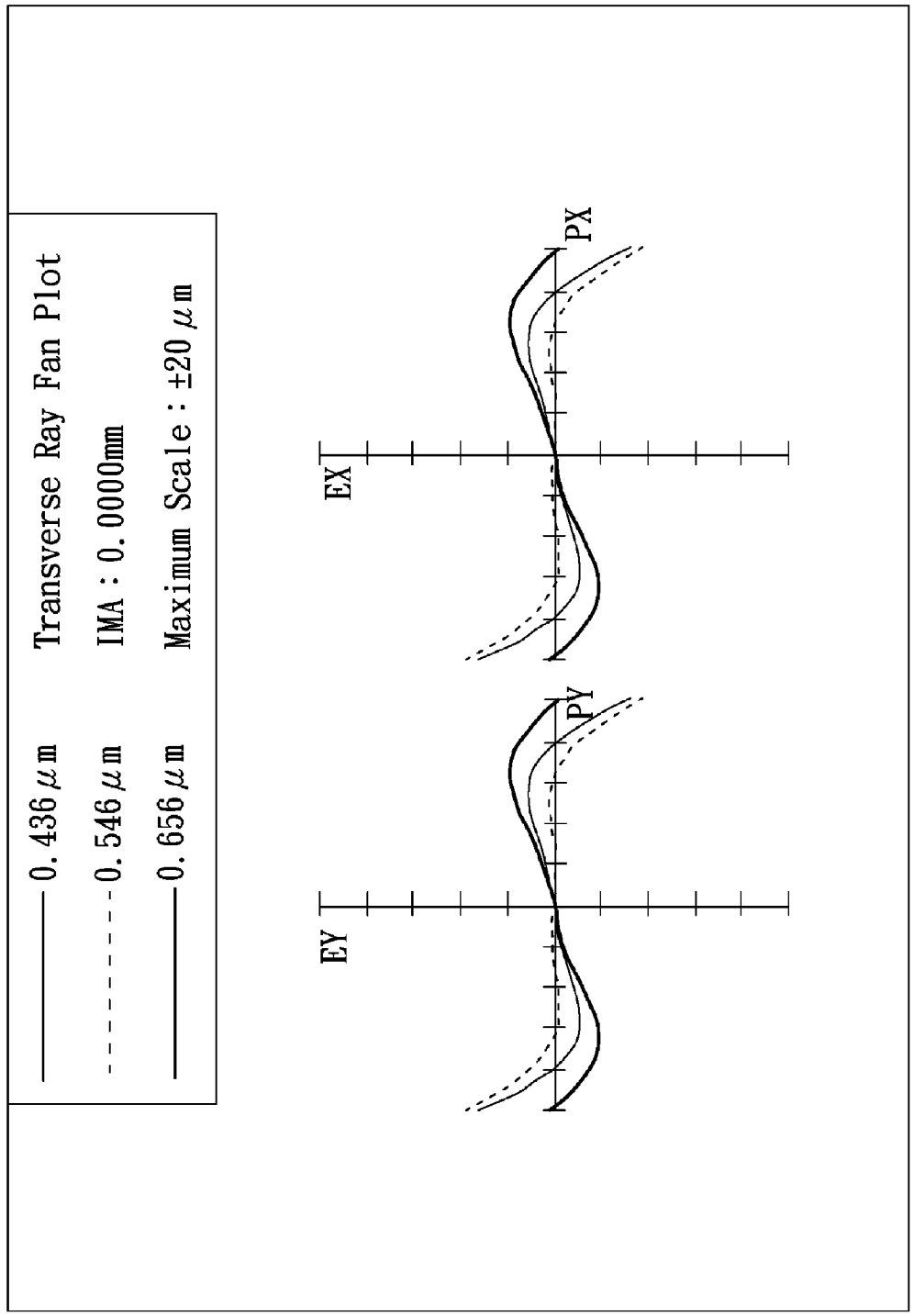
FIG. 4D is a transverse ray fan diagram of a zoom lens at wide-angle end in accordance with the first embodiment of the invention.
Figure 4E:
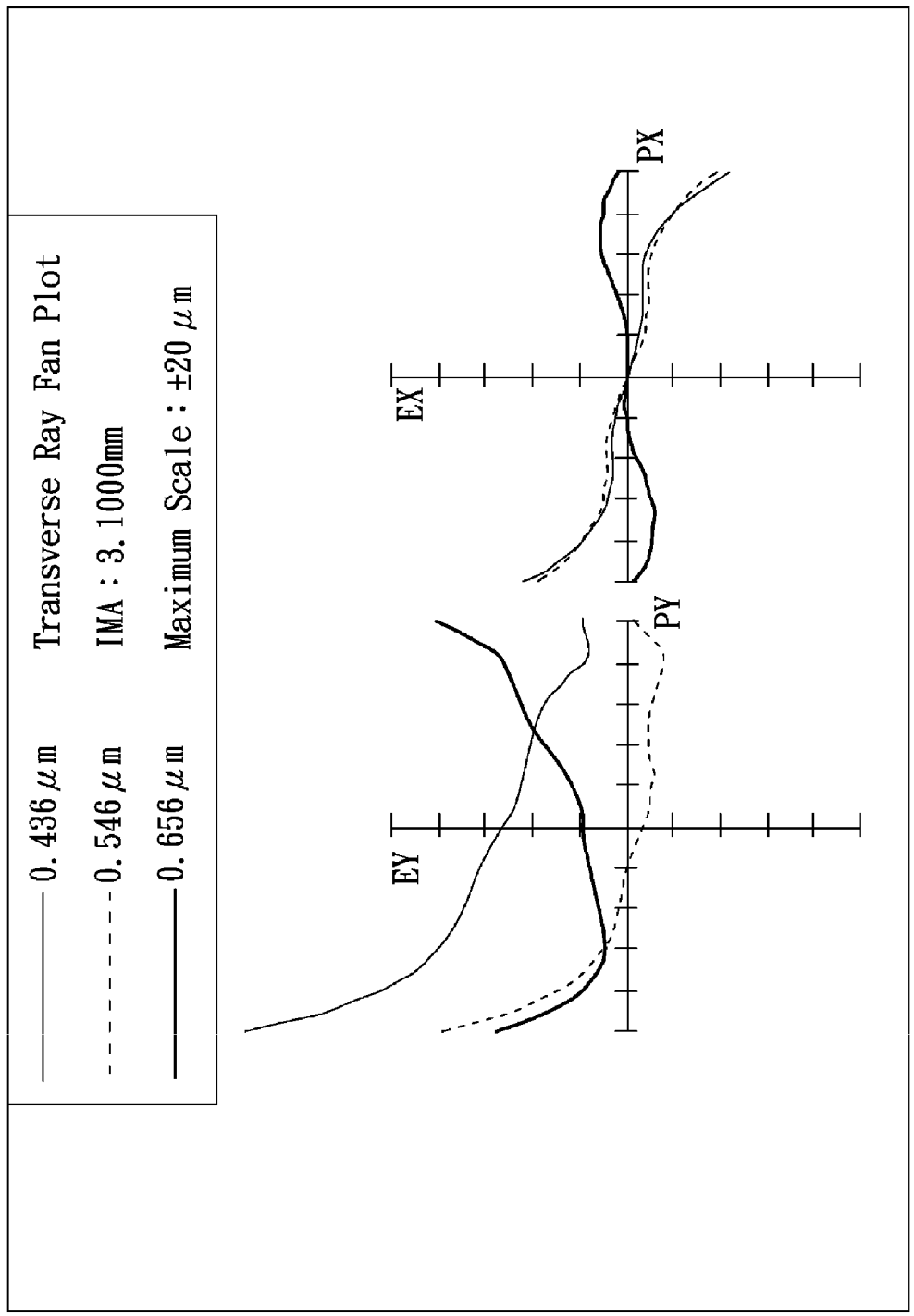
FIG. 4E is a transverse ray fan diagram of a zoom lens at wide-angle end in accordance with the first embodiment of the invention.
Figure 4F:
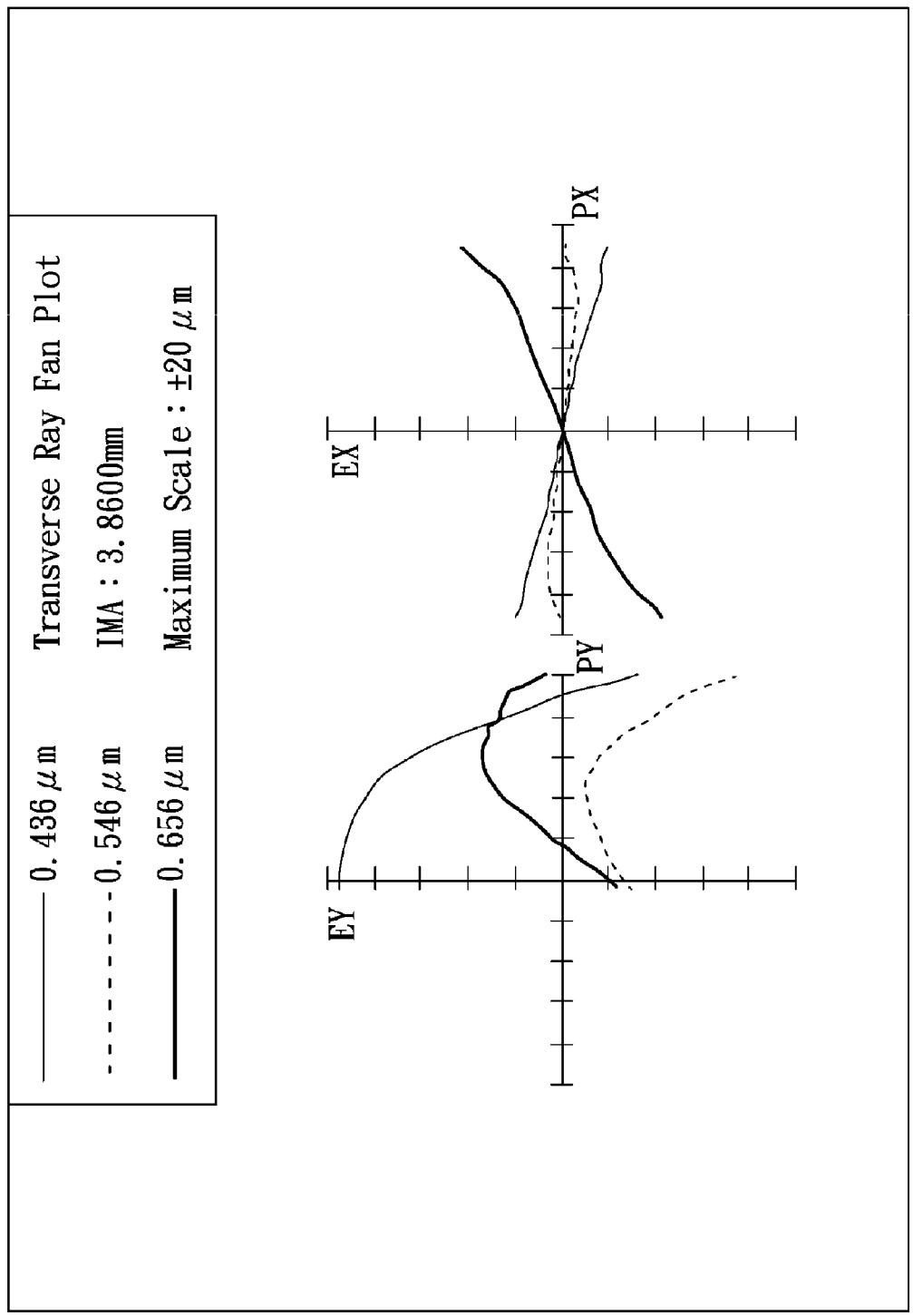
FIG. 4F is a transverse ray fan diagram of a zoom lens at wide-angle end in accordance with the first embodiment of the invention.
Figure 4G:
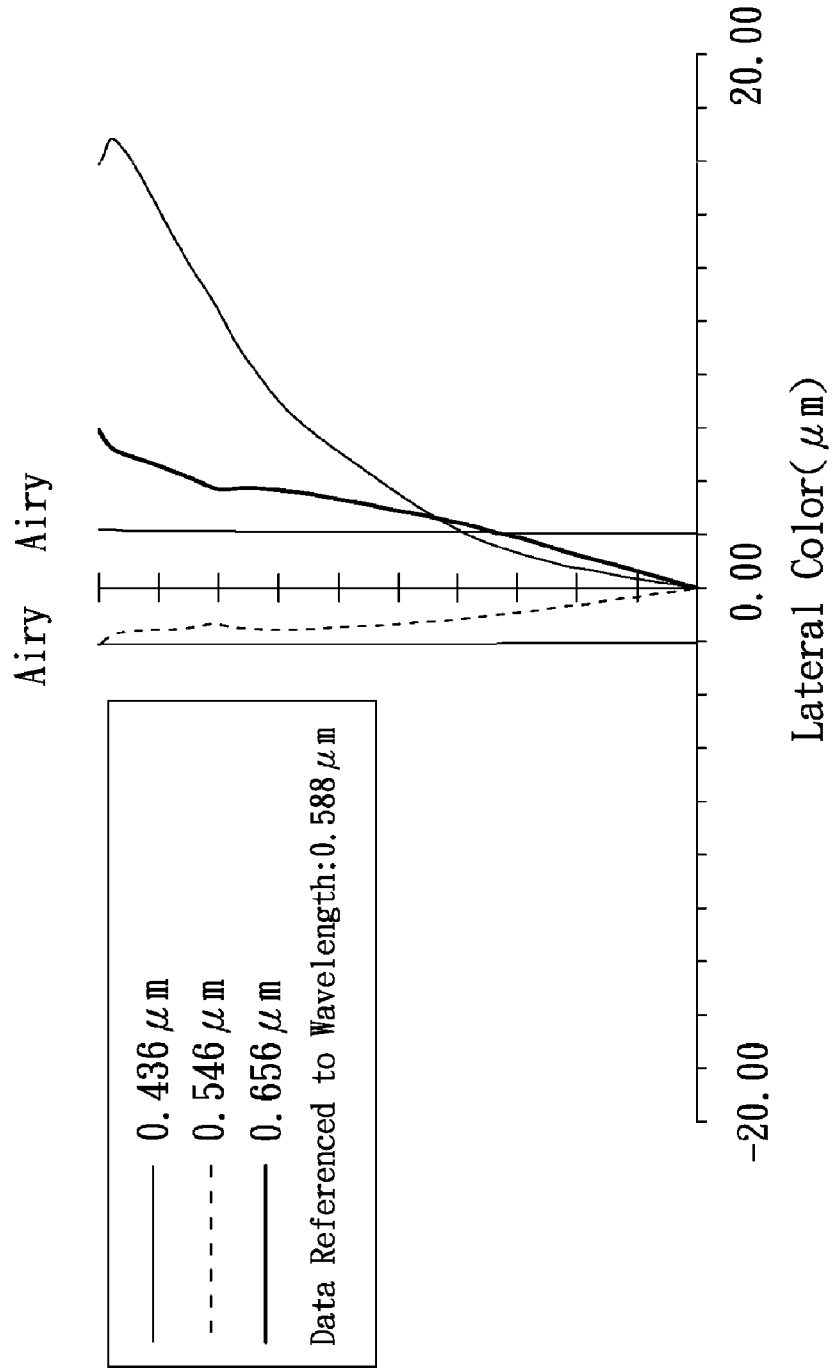
FIG. 4G is a lateral color diagram of a zoom lens at wide-angle end in accordance with the first embodiment of the invention.
Figure 5A:
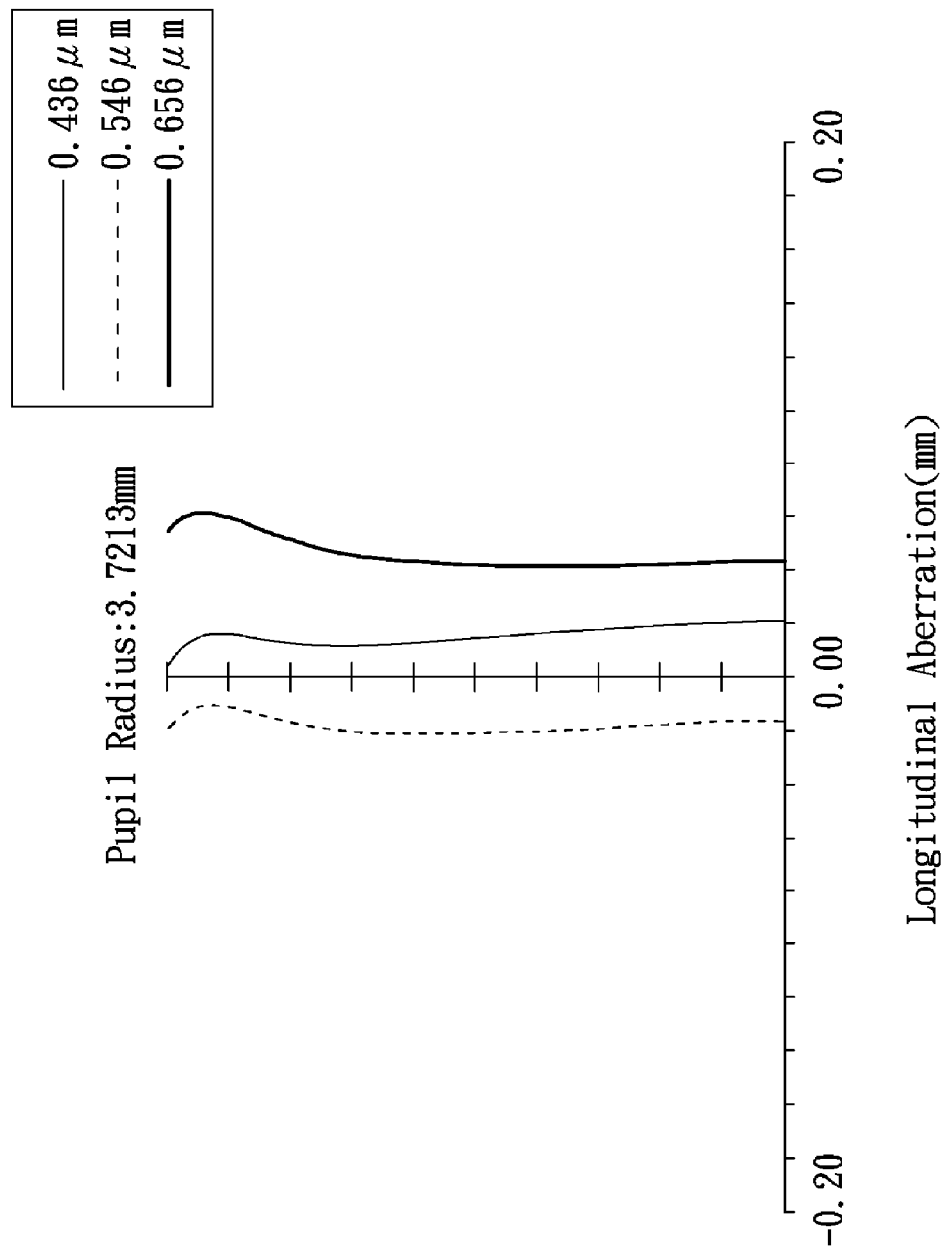
FIG. 5A is a longitudinal aberration diagram of a zoom lens at medium end in accordance with the first embodiment of the invention.
Figure 5B:
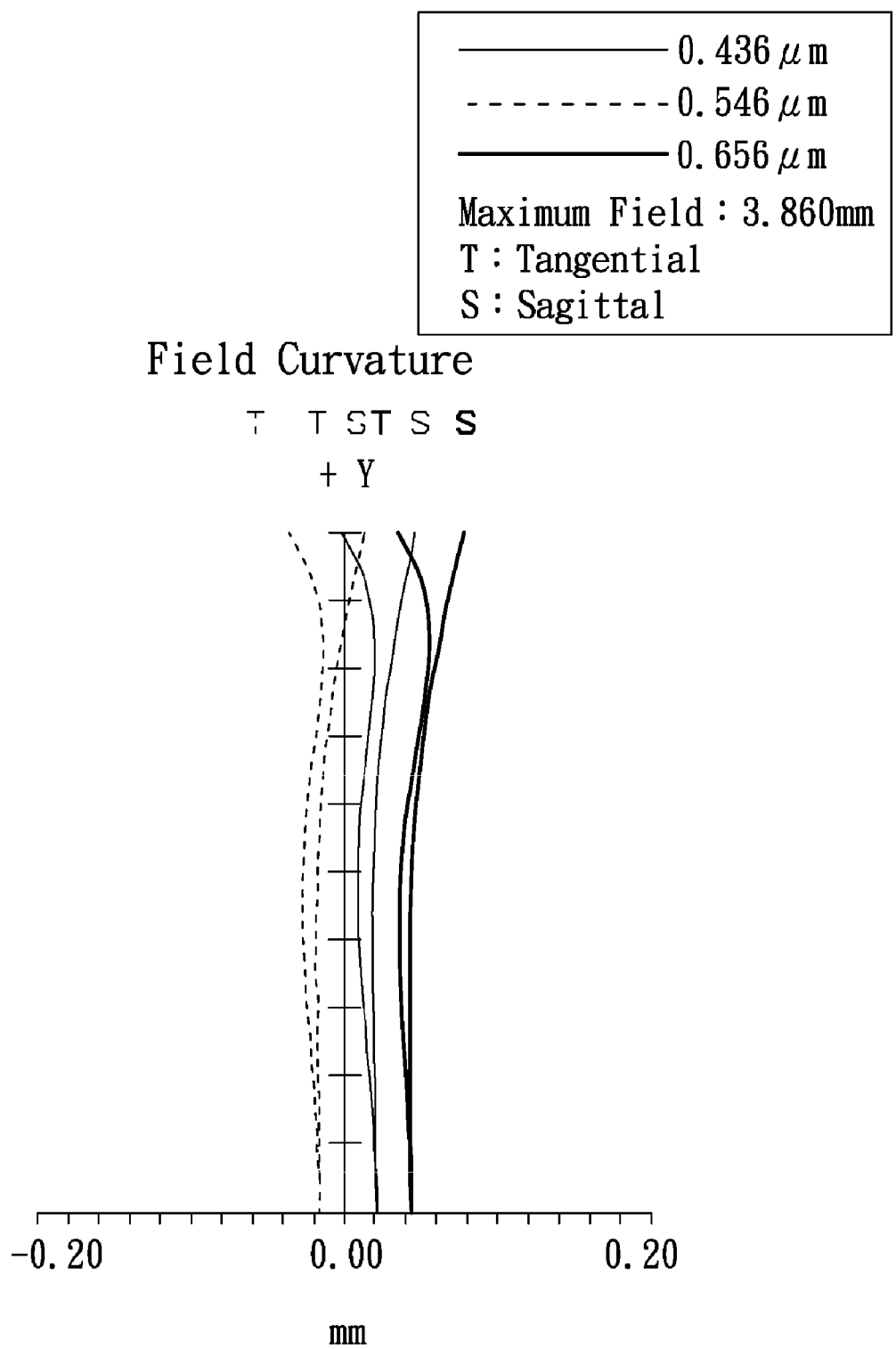
FIG. 5B is a field curvature diagram of a zoom lens at medium end in accordance with the first embodiment of the invention.
Figure 5C:
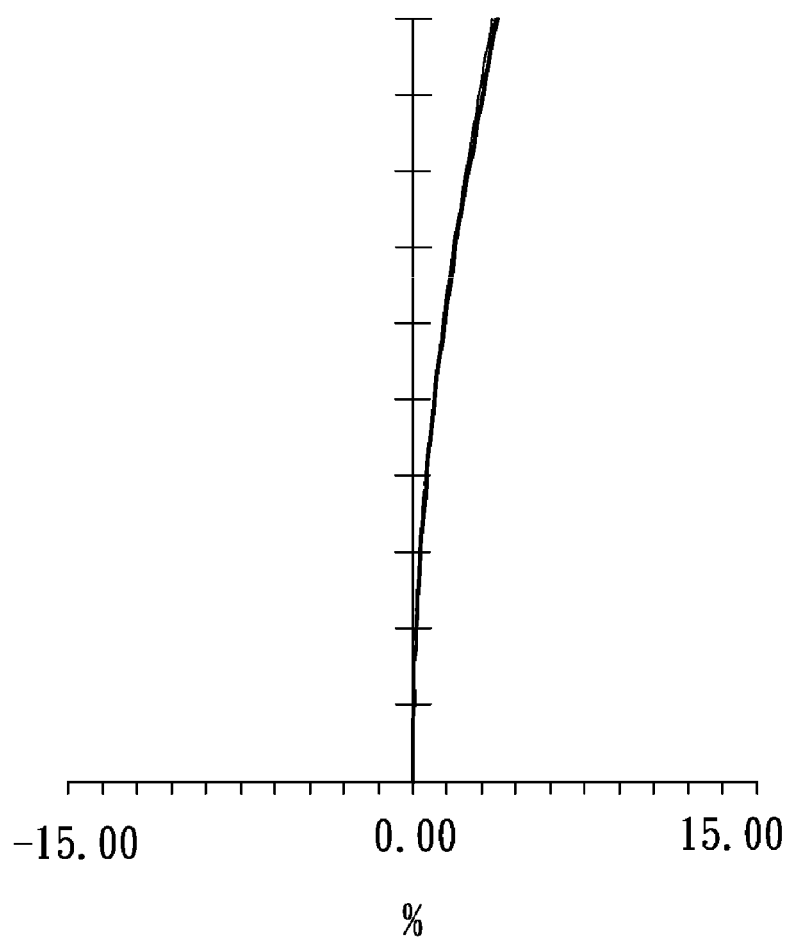
FIG. 5C is a distortion diagram of a zoom lens at medium end in accordance with the first embodiment of the invention.
Figure 5D:
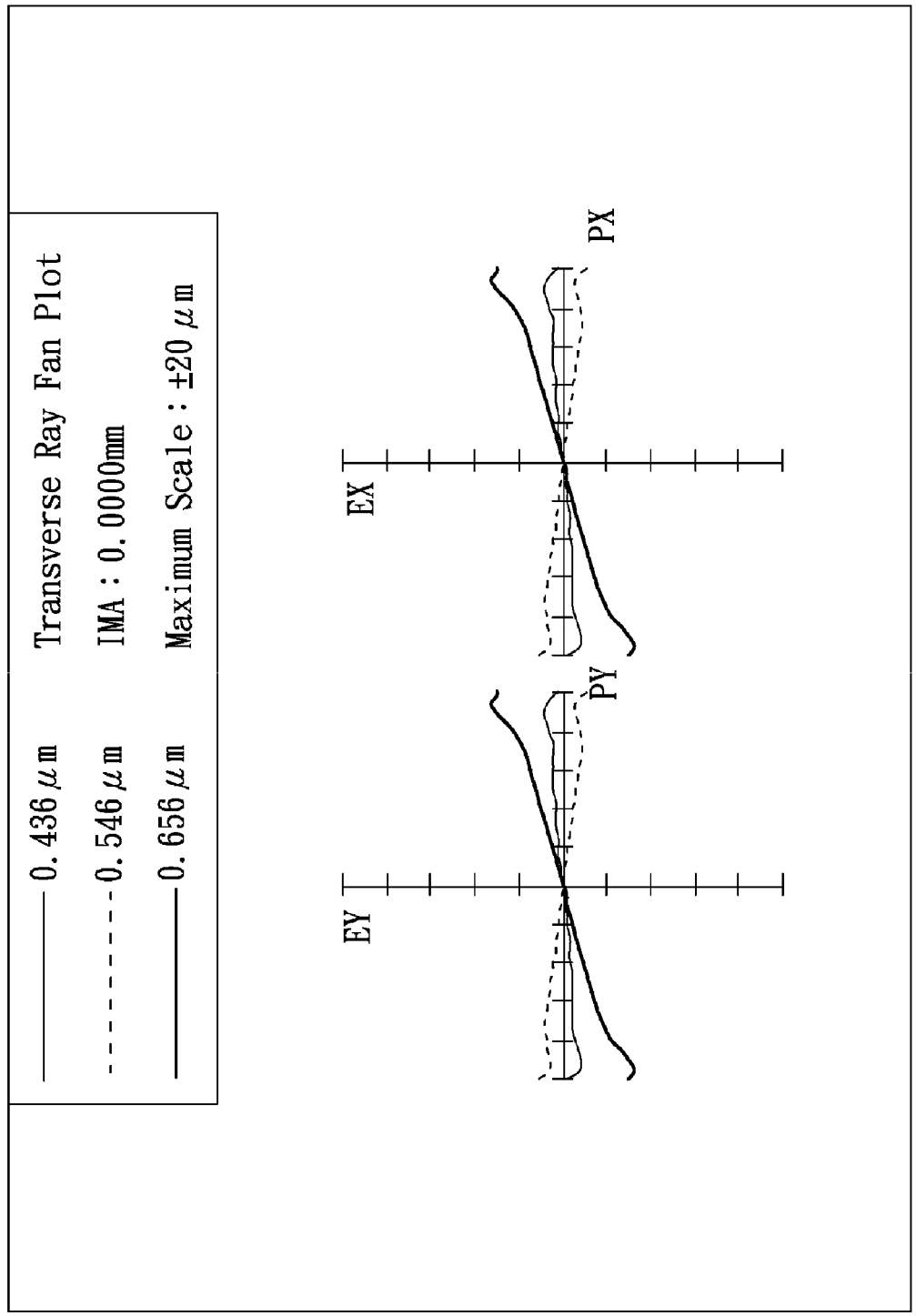
FIG. 5D is a transverse ray fan diagram of a zoom lens at medium end in accordance with the first embodiment of the invention.
Figure 5E:
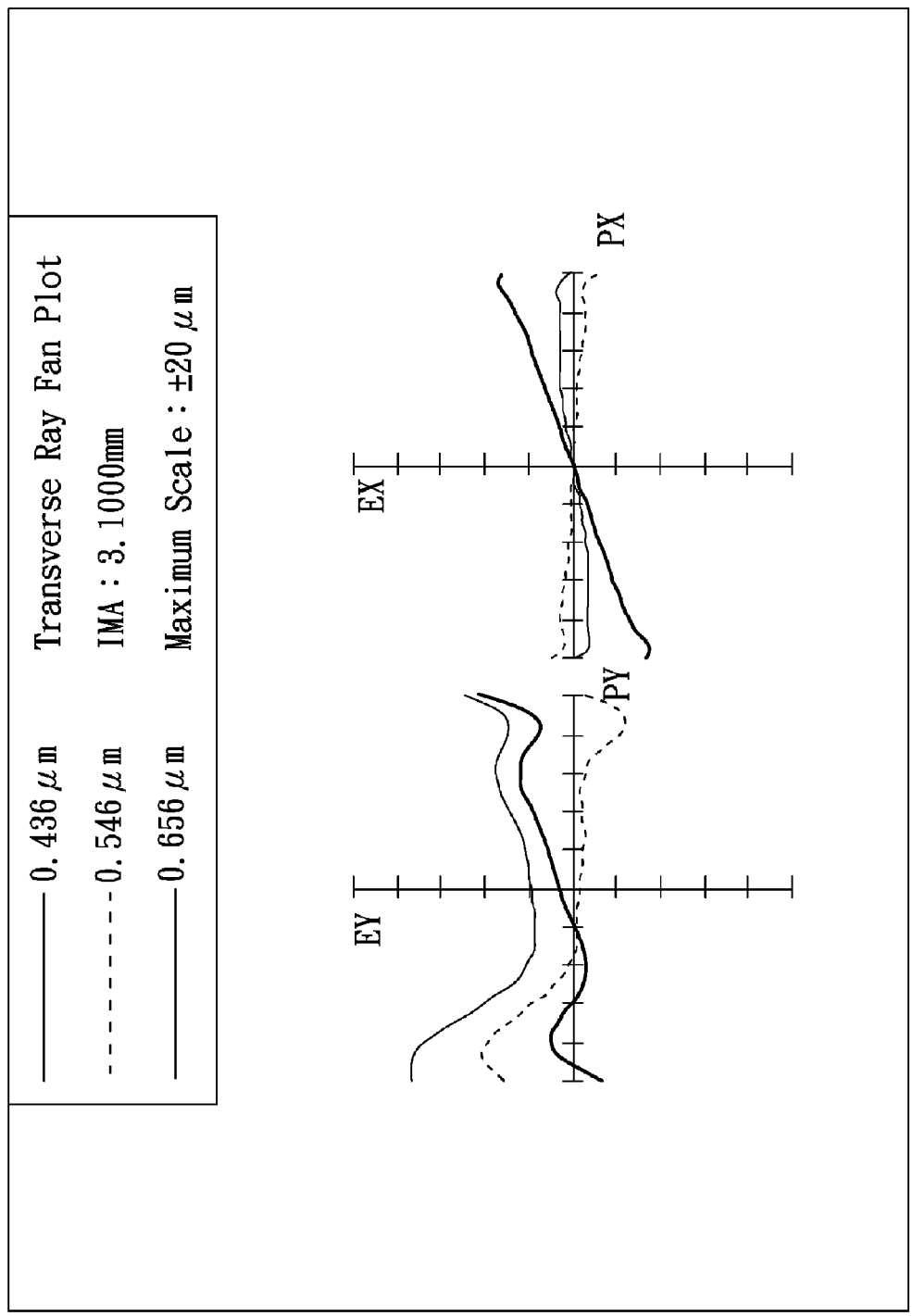
FIG. 5E is a transverse ray fan diagram of a zoom lens at medium end in accordance with the first embodiment of the invention.
Figure 5F:
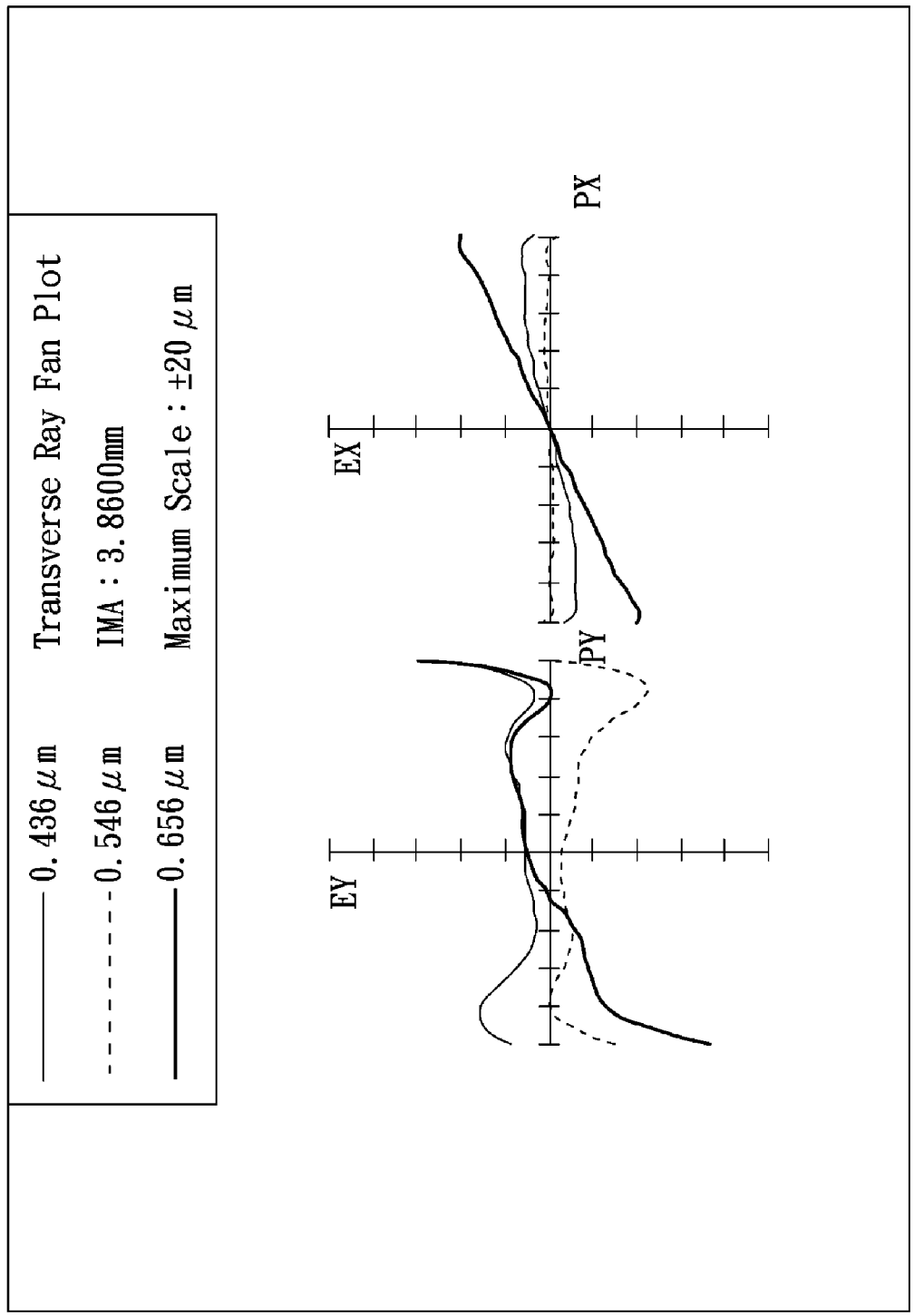
FIG. 5F is a transverse ray fan diagram of a zoom lens at medium end in accordance with the first embodiment of the invention.
Figure 5G:
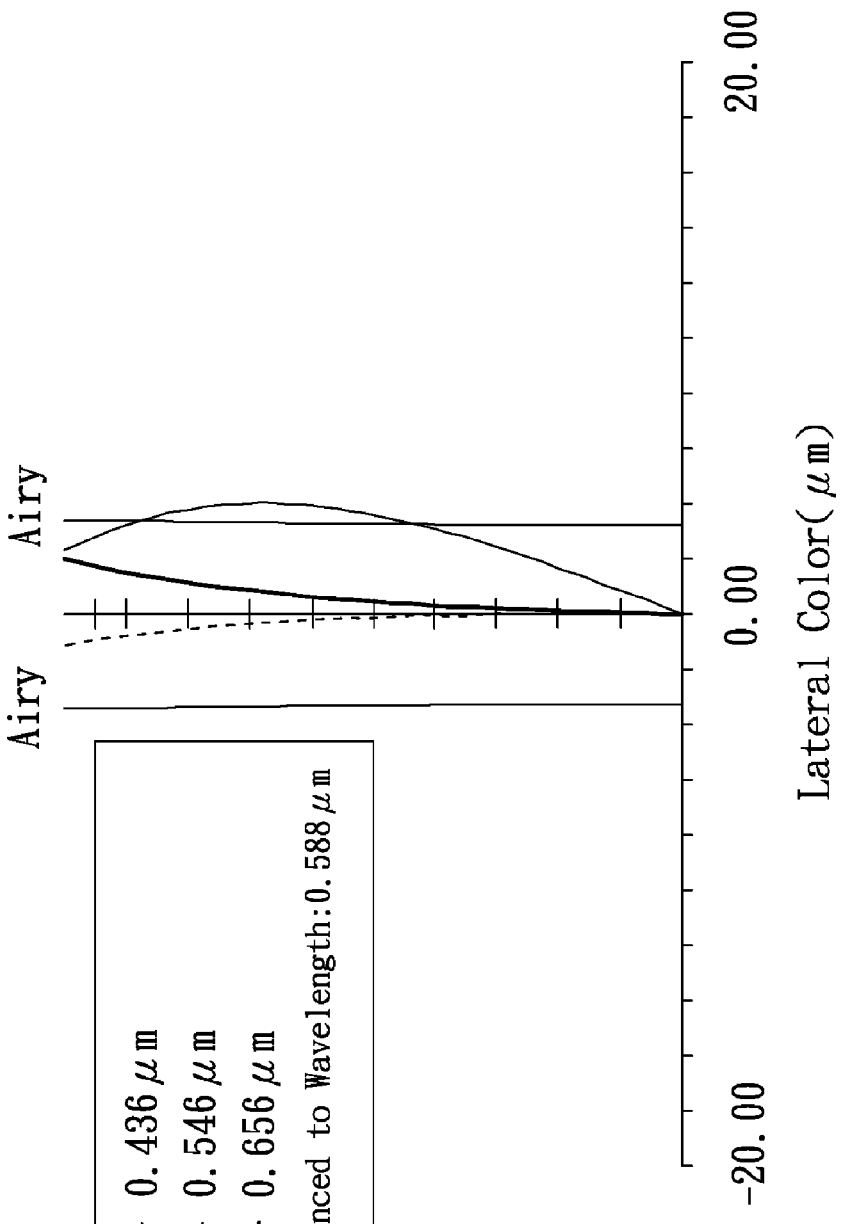
FIG. 5G is a lateral color diagram of a zoom lens at medium end in accordance with the first embodiment of the invention.
Figure 6B:
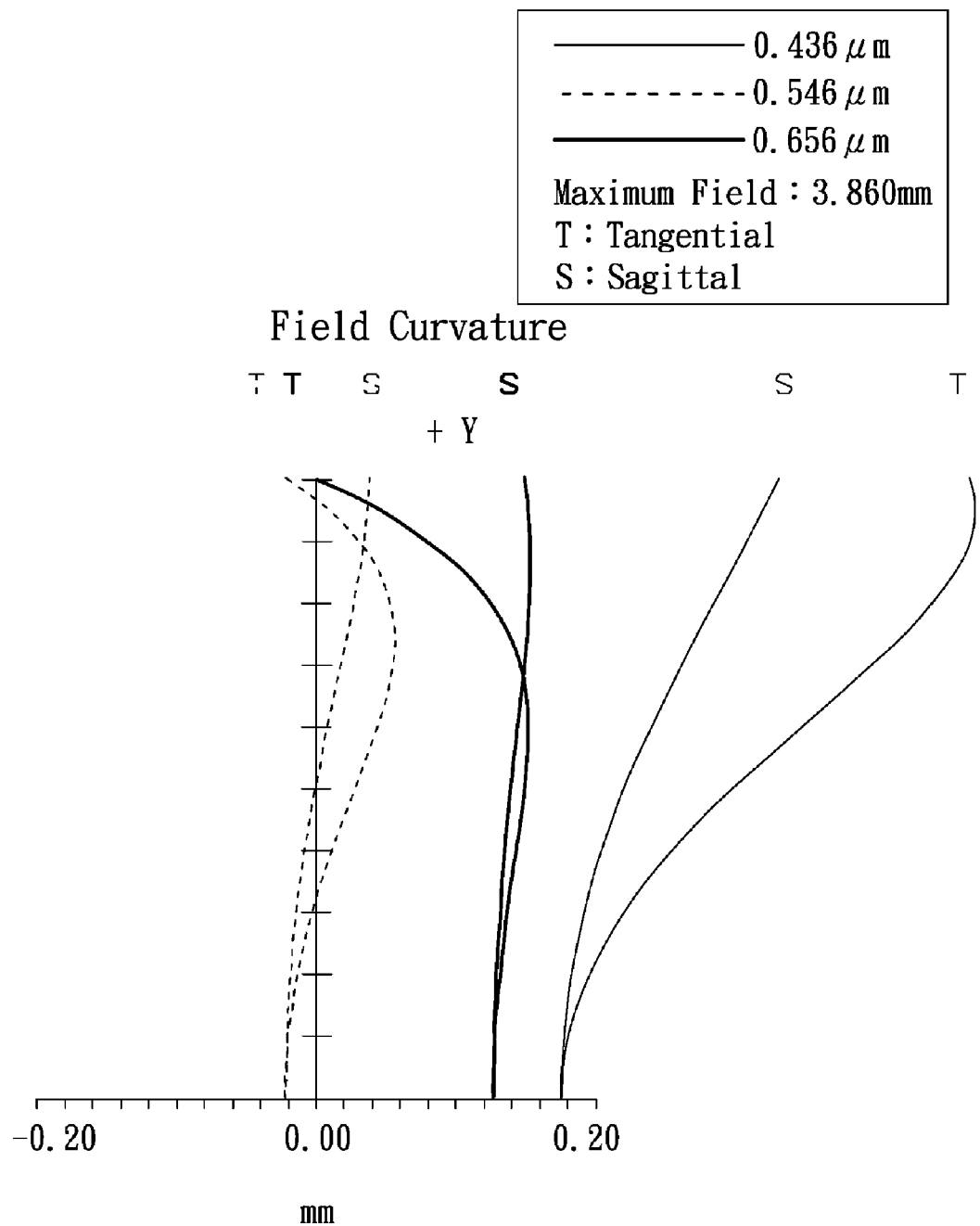
FIG. 6B is a field curvature diagram of a zoom lens at telephoto end in accordance with the first embodiment of the invention.
Figure 6C:
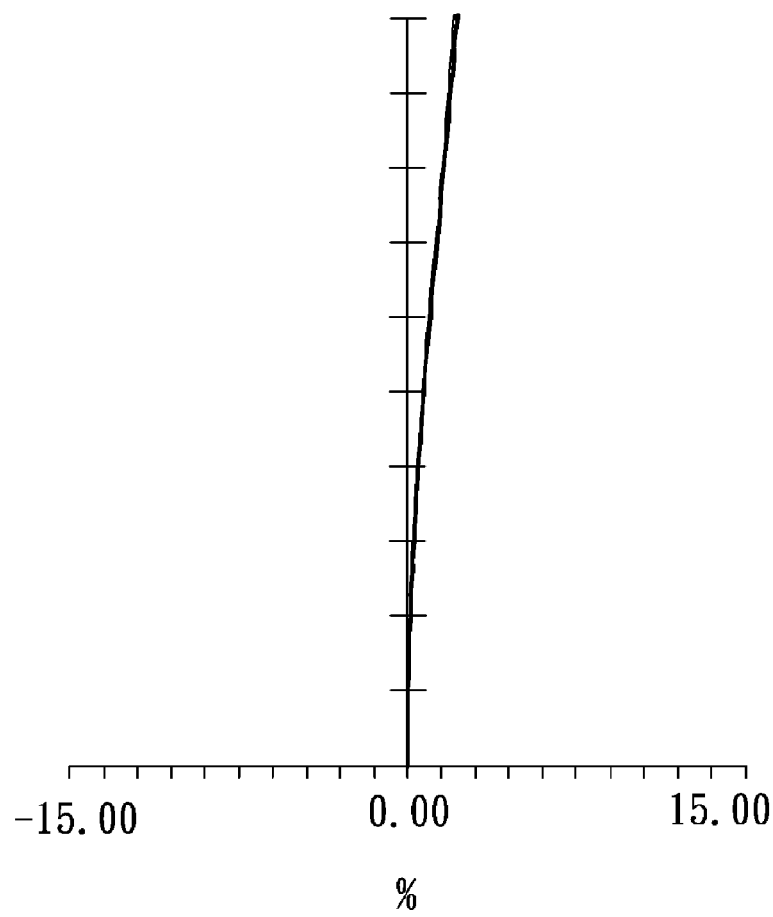
FIG. 6C is a distortion diagram of a zoom lens at telephoto end in accordance with the first embodiment of the invention.

By the above arrangements of the lenses and stop ST1, the zoom lens 1 of the first embodiment at the wide-angle end, medium end and telephoto end can meet the requirements of optical performance as seen in FIGS. 4A-4G, FIG. 5A-5G and FIG. 6A-6G wherein FIG. 4A, FIG. 5A and FIG. 6A show the longitudinal aberration diagram of the zoom lens 1 of the first embodiment at the wide-angle end, medium end and telephoto end, FIG. 4B, FIG. 5B and FIG. 6B show the field curvature diagram of the zoom lens 1 of the first embodiment at the wide-angle end, medium end and telephoto end, FIG. 4C, FIG. 5C and FIG. 6C show the distortion diagram of the zoom lens 1 of the first embodiment at the wide-angle end, medium end and telephoto end, FIG. 4D-4F, FIG. 5D-5F and FIG. 6D-6F show the transverse ray fan diagram of the zoom lens 1 of the first embodiment at the wide-angle end, medium end and telephoto end, and FIG. 4G, FIG. 5G and FIG. 6G show the lateral color diagram of the zoom lens 1 of the first embodiment at the wide-angle end, medium end and telephoto end.

FIG. 4A shows that the longitudinal aberration in the zoom lens 1 of the first embodiment at the wide-angle end ranges between −0.04 mm and 0.04 mm for the wavelengths of 0.436 μm, 0.546 μm and 0.656 μm. FIG. 4B shows that the field curvature of tangential direction and sagittal direction in the zoom lens 1 of the first embodiment at the wide-angle end ranges between −0.10 mm and 0.03 mm for the wavelengths of 0.436 μm, 0.546 μm and 0.656 μm. FIG. 4C shows (the three lines in the figure almost coincide to appear as if one line) that the distortion in the zoom lens 1 of the first embodiment at the wide-angle end ranges between −12% and 0% for the wavelengths of 0.436 μm, 0.546 μm and 0.656 μm. FIG. 4D, FIG. 4E and FIG. 4F show that the transverse ray fan of different image highs in the zoom lens 1 of the first embodiment at the wide-angle end ranges between −14.0 μm and 33.0 μm for the wavelengths of 0.436 μm, 0.546 μm and 0.656 μm. FIG. 4G shows that the lateral color of different fields with reference wavelength of 0.588 μm in the zoom lens 1 of the first embodiment at the wide-angle end ranges between −2.0 μm and 17.0 μm for the wavelengths of 0.436 μm, 0.546 μm and 0.656 μm. It is obvious that the longitudinal aberration, the field curvature, the distortion and the lateral color of the zoom lens 1 of the first embodiment at the wide-angle end can be corrected effectively, thereby capable of obtaining good optical performance.

FIG. 5A shows that the longitudinal aberration in the zoom lens 1 of the first embodiment at the medium end ranges between −0.02 mm and 0.07 mm for the wavelengths of 0.436 μm, 0.546 μm and 0.656 μm. FIG. 5B shows that the field curvature of tangential direction and sagittal direction in the zoom lens 1 of the first embodiment at medium end ranges between −0.04 mm and 0.09 mm for the wavelengths of 0.436 μm, 0.546 μm and 0.656 μm. FIG. 5C (the three lines in the figure almost coincide to appear as if one line) shows that the distortion in the zoom lens 1 of the first embodiment at the medium end ranges between −0% and 4.5% for the wavelengths of 0.436 μm, 0.546 μm and 0.656 μm. FIG. 5D, FIG. 5E and FIG. 5F show that the transverse ray fan of different image highs in the zoom lens 1 of the first embodiment at the medium end ranges between −15.0 μm and 16.0 μm for the wavelengths of 0.436 μm, 0.546 μm and 0.656 μm. FIG. 5G shows that the lateral color of different fields with reference wavelength of 0.588 μm in the zoom lens 1 of the first embodiment at the medium end ranges between −2.0 μm and 5.0 μm for the wavelengths of 0.436 μm, 0.546 μm and 0.656 μm. It is obvious that the longitudinal aberration, the field curvature, the distortion and the lateral color of the zoom lens 1 of the first embodiment at the medium end can be corrected effectively, thereby capable of obtaining good optical performance.

Figure 6D:
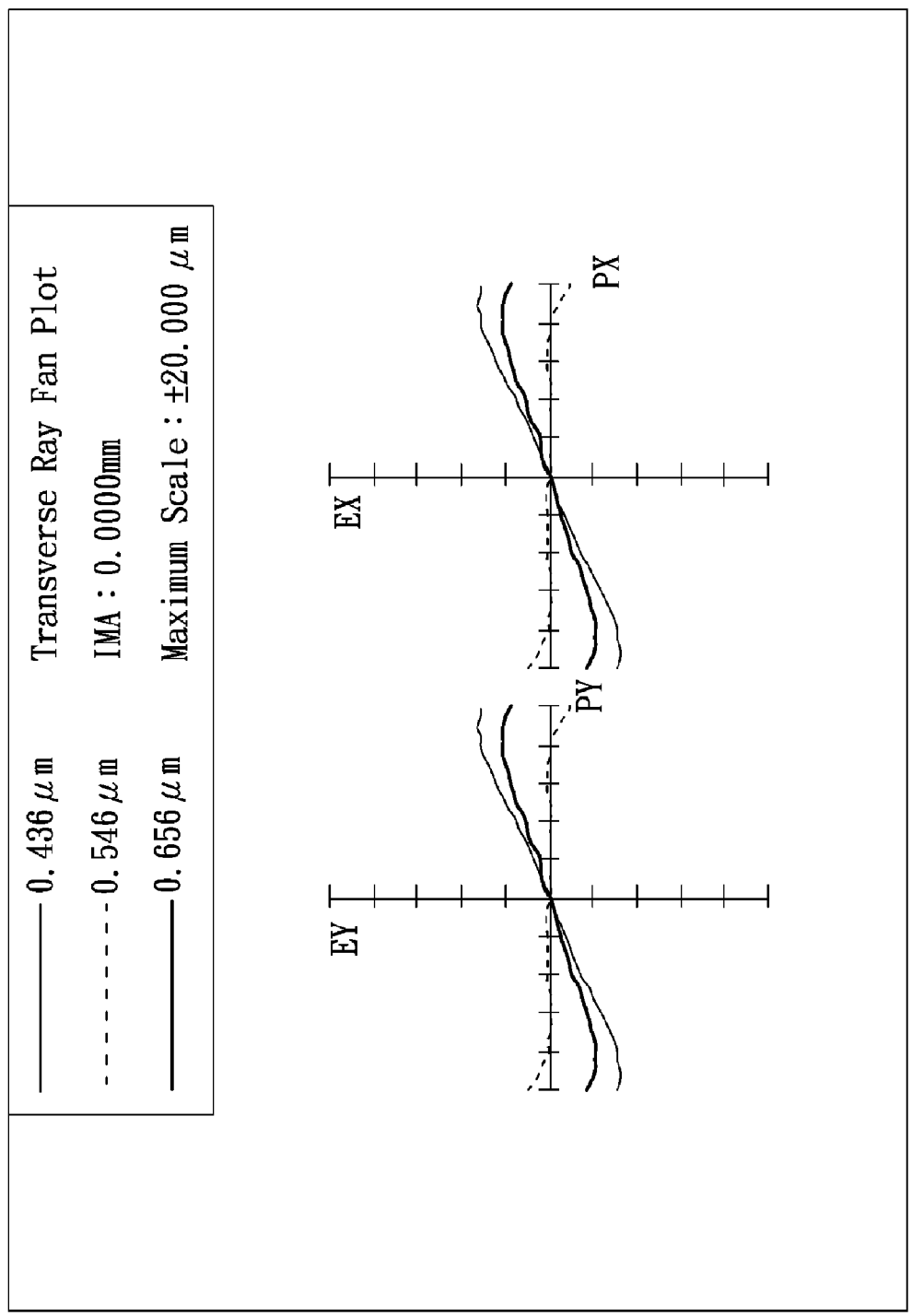
FIG. 6D is a transverse ray fan diagram of a zoom lens at telephoto end in accordance with the first embodiment of the invention.
Figure 6E:
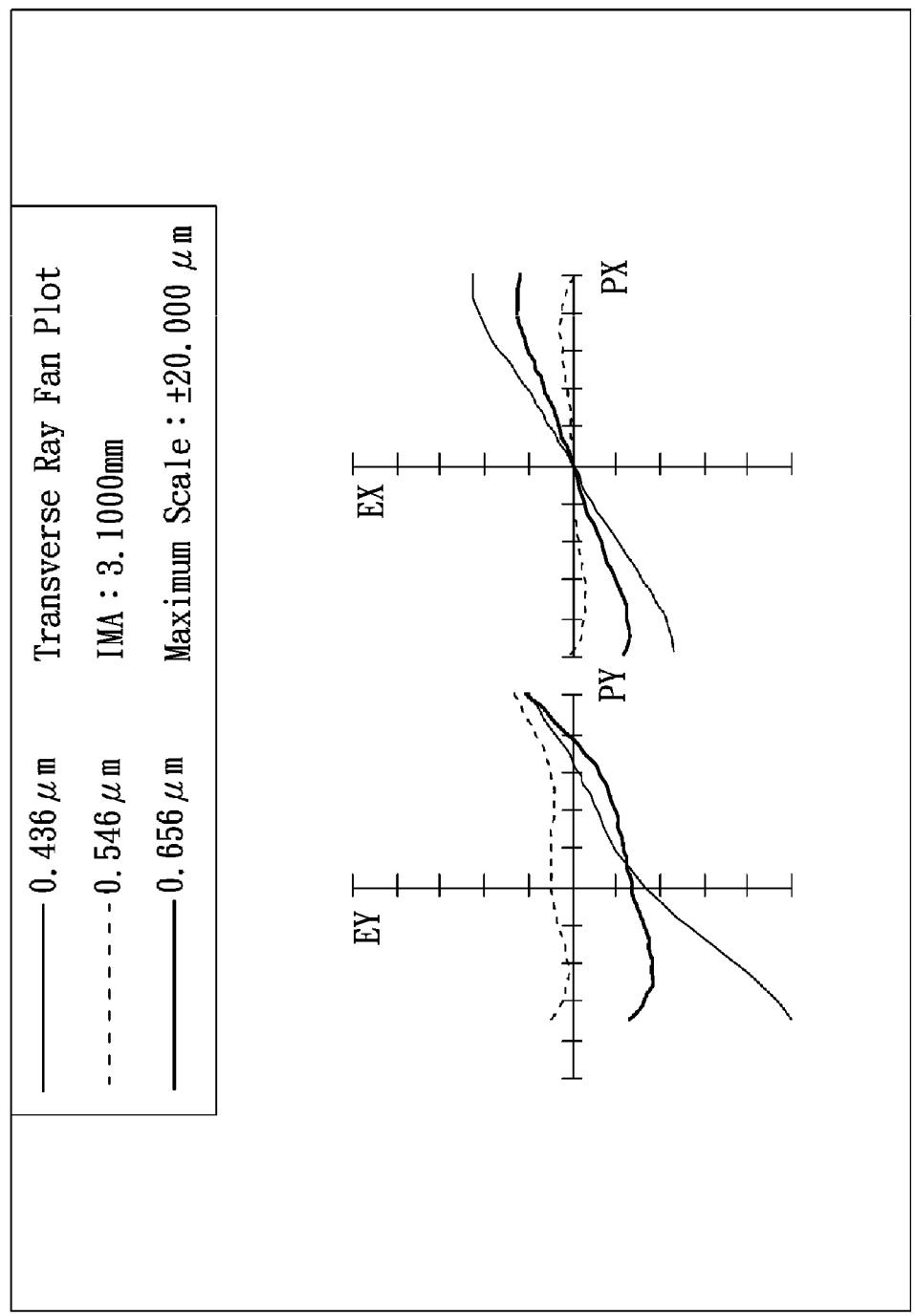
FIG. 6E is a transverse ray fan diagram of a zoom lens at telephoto end in accordance with the first embodiment of the invention.
Figure 6F:
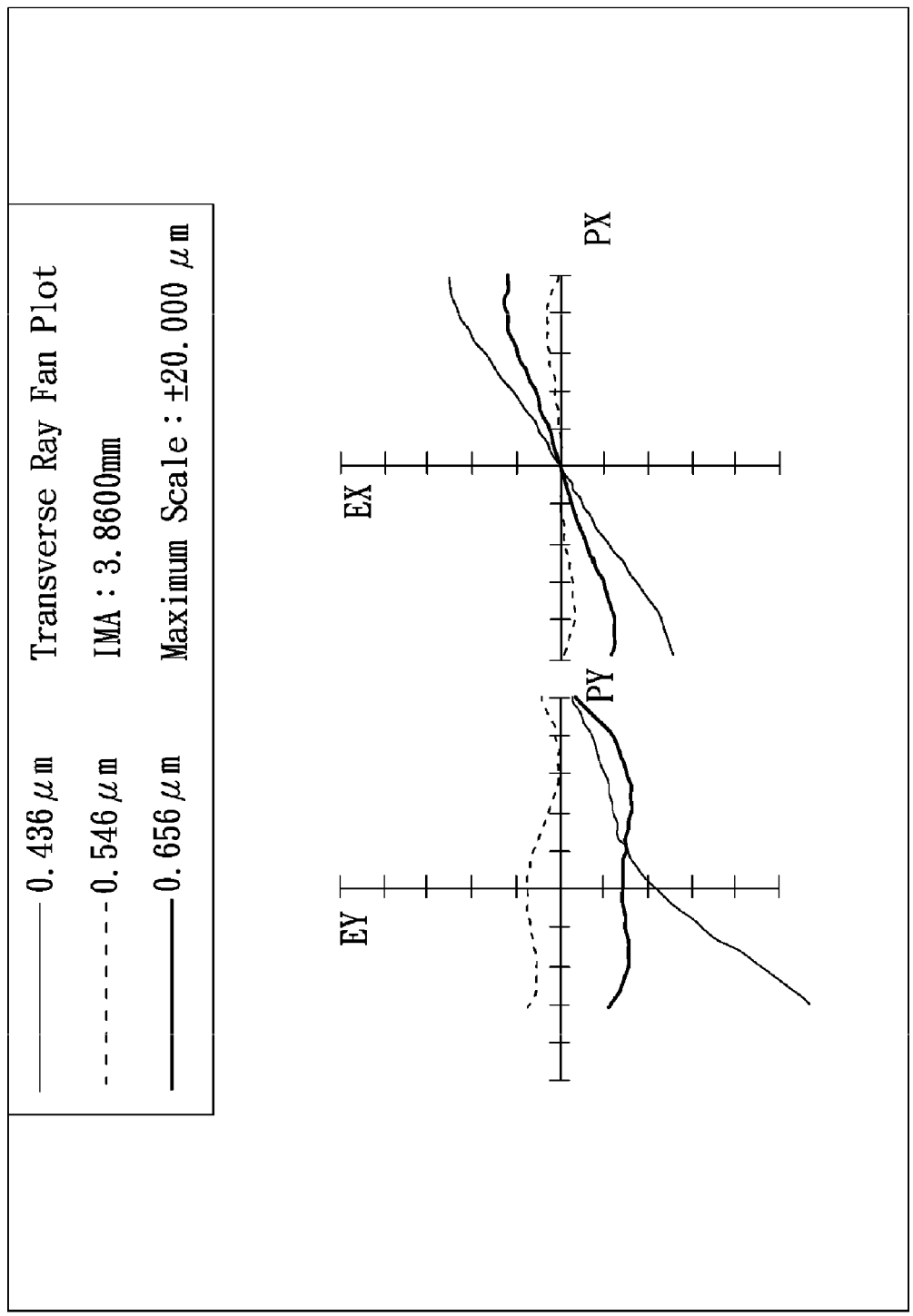
FIG. 6F is a transverse ray fan diagram of a zoom lens at telephoto end in accordance with the first embodiment of the invention.

FIG. 6A shows that the longitudinal aberration in the zoom lens 1 of the first embodiment at the telephoto end ranges between −0.05 mm and 0.21 mm for the wavelengths of 0.436 µm, 0.546 µm and 0.656 µm. FIG. 6B shows that the field curvature of tangential direction and sagittal direction in the zoom lens 1 of the first embodiment at the telephoto end ranges between −0.03 mm and 0.47 mm for the wavelengths of 0.436 µm, 0.546 µm and 0.656 µm. FIG. 6C shows (the three lines in the figure almost coincide to appear as if one line) that the distortion in the zoom lens 1 of the first embodiment at the telephoto end ranges between 0% and 3% for the wavelengths of 0.436 µm, 0.546 µm and 0.656 µm. FIG. 6D, FIG. 6E and FIG. 6F show that the transverse ray fan of different image highs in the zoom lens 1 of the first embodiment at the telephoto end ranges between −24.0 µm and 12.0 µm for the wavelengths of 0.436 µm, 0.546 µm and 0.656 µm. FIG. 6G shows that the lateral color of different fields with reference wavelength of 0.588 µm in the zoom lens 1 of the first embodiment at the telephoto end ranges between −6.0 µm and 3.0 µm for the wavelengths of 0.436 µm, 0.546 µm and 0.656 µm. It is obvious that the longitudinal aberration, the field curvature, the distortion and the lateral color of the zoom lens 1 of the first embodiment at the telephoto end can be corrected effectively, thereby capable of obtaining good optical performance.

Figure 7:
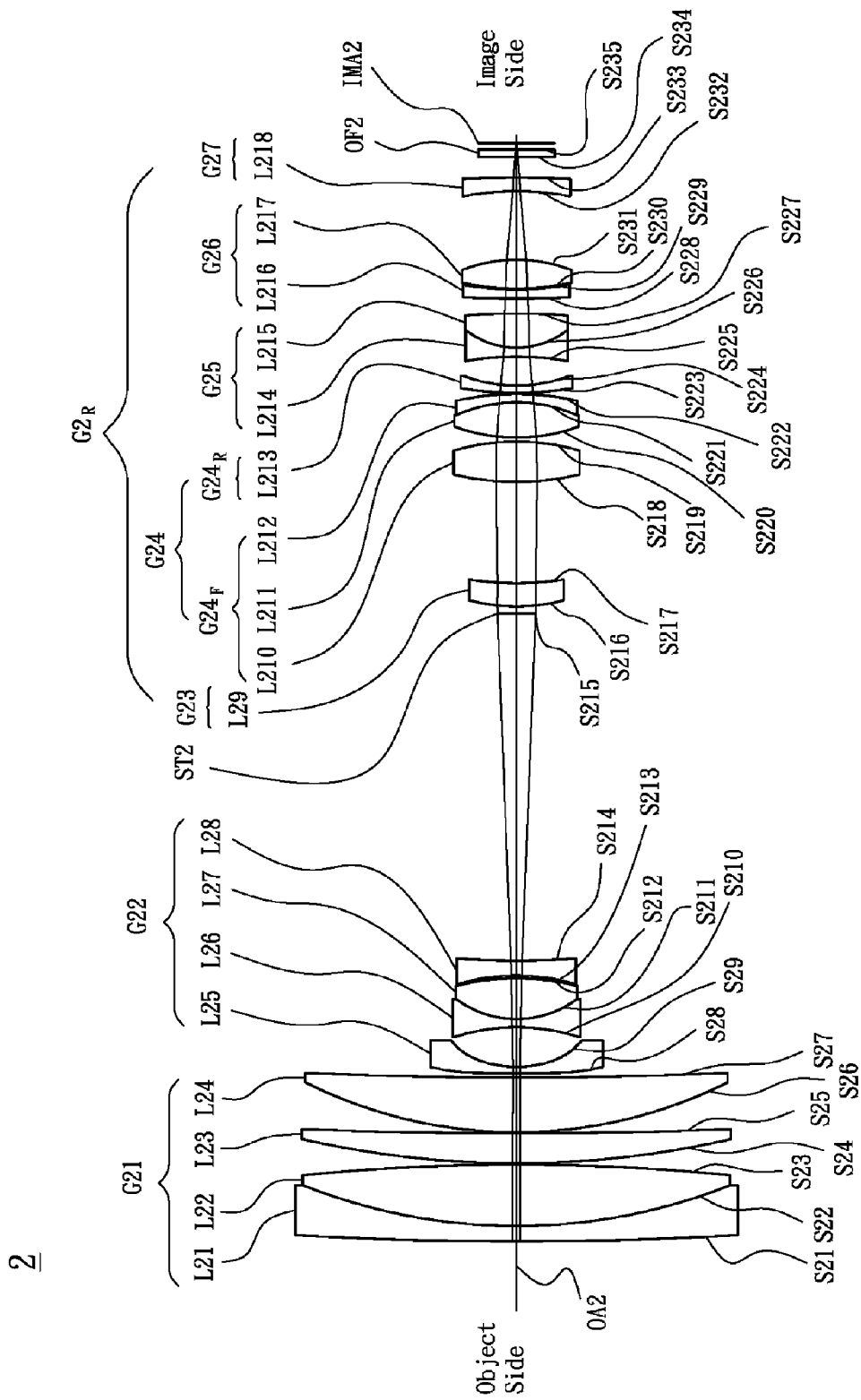
FIG. 7 is a lens layout and optical path diagram of a zoom lens at wide-angle end in accordance with a second embodiment of the invention.
Figure 8:
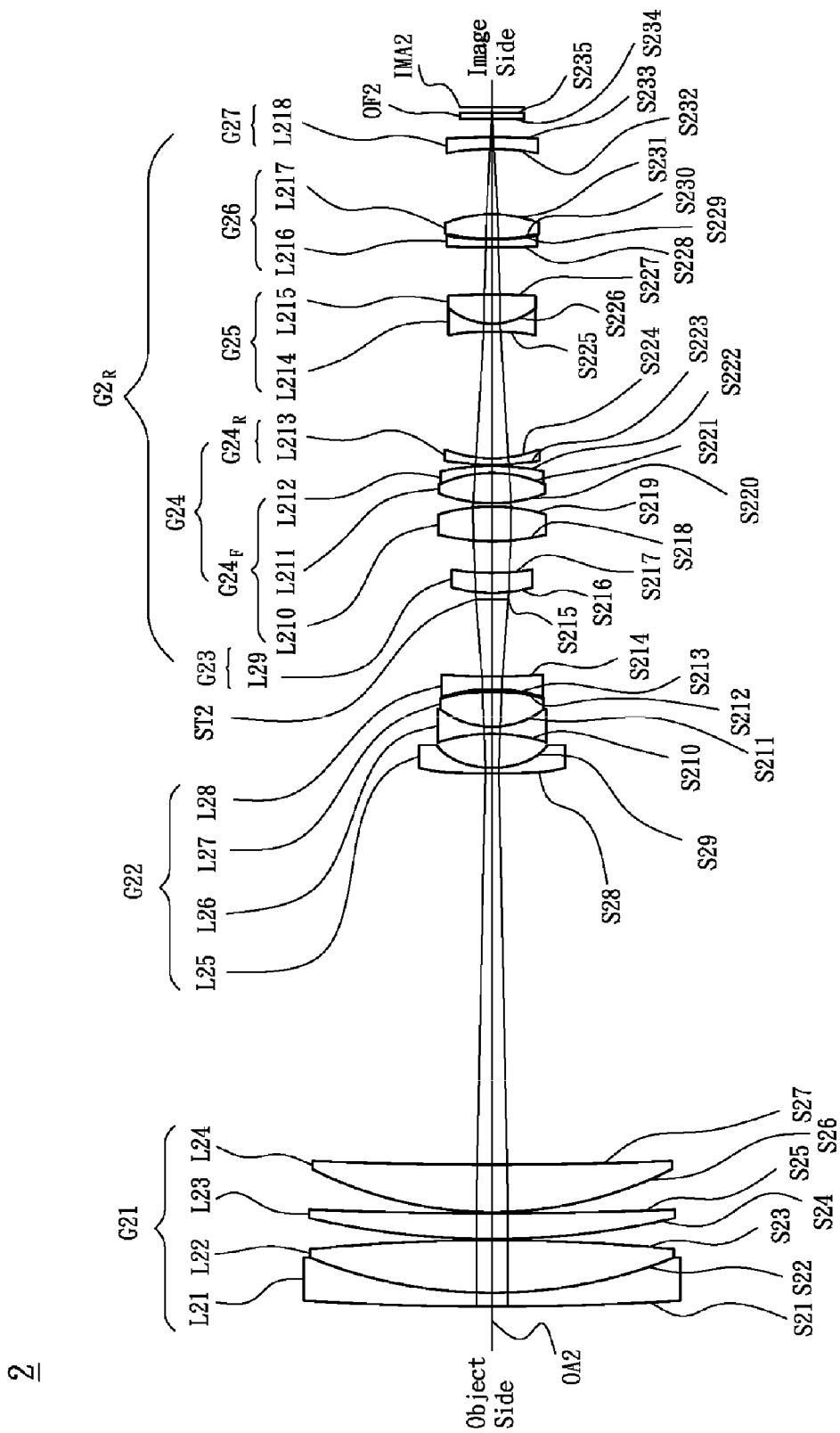
FIG. 8 is a lens layout and optical path diagram of a zoom lens at medium end in accordance with the second embodiment of the invention.
Figure 9:
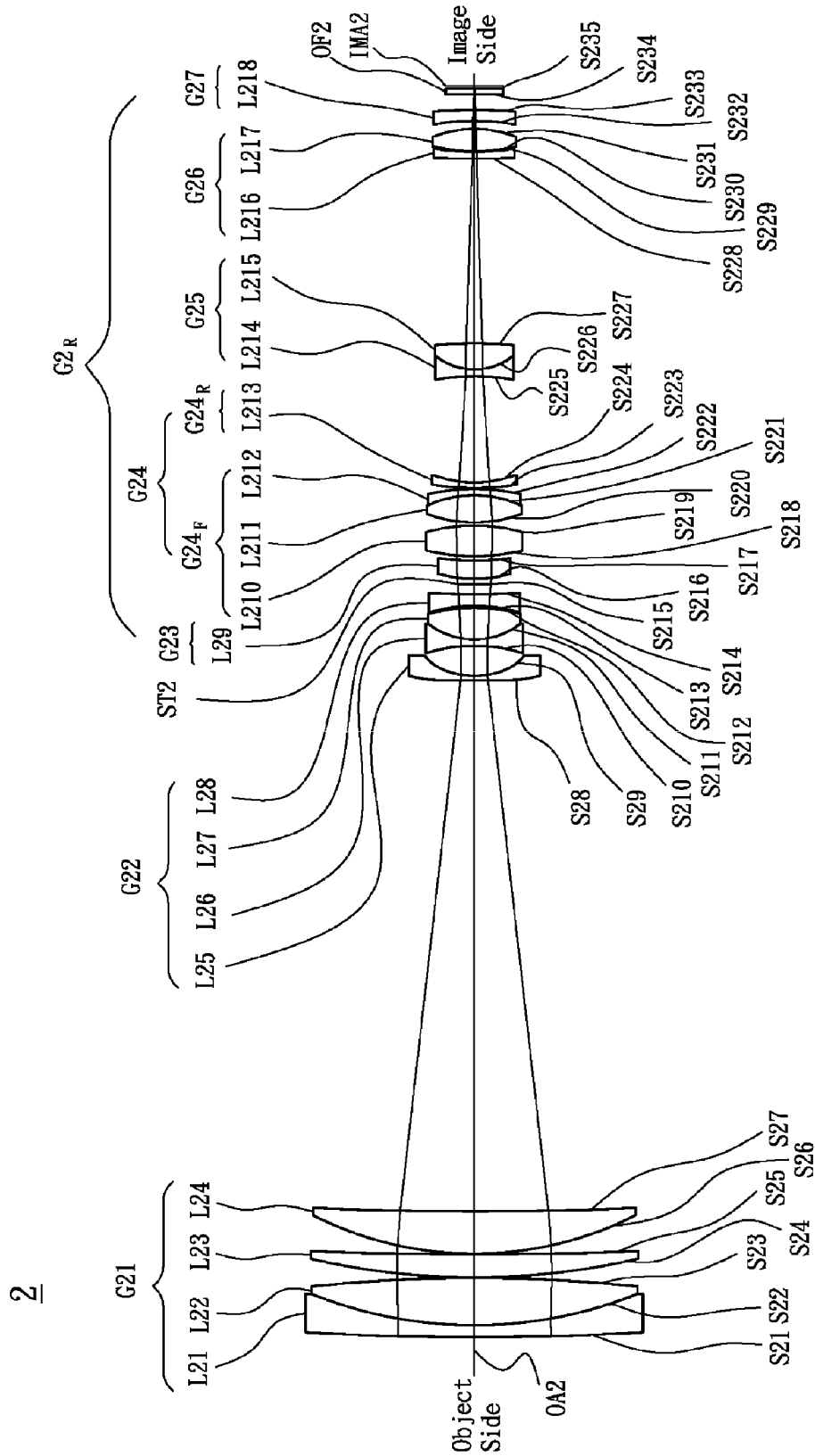
FIG. 9 is a lens layout and optical path diagram of a zoom lens at telephoto end in accordance with the second embodiment of the invention.

Referring to FIG. 7, FIG. 8 and FIG. 9, FIG. 7 is a lens layout and optical path diagram of a zoom lens at wide-angle end in accordance with a second embodiment of the invention, FIG. 8 is a lens layout and optical path diagram of a zoom lens at medium end in accordance with the second embodiment of the invention and FIG. 9 is a lens layout and optical path diagram of a zoom lens at telephoto end in accordance with the second embodiment of the invention. The zoom lens 2, in sequence from an object side to an image side along an optical axis OA2, comprises: a first lens group G21 having positive refractive power; a second lens group G22 having negative refractive power; a stop ST2; and a rear lens group $G2_R$ having positive refractive power and an optical filter OF2. In operation, an image of light rays from the object side is formed at an image plane IMA2.

In the second embodiment of the zoom lens 2, the first lens group G21 comprises a first lens L21, a second lens L22, a third lens L23 and a fourth lens L24. The first lens L21 is a meniscus negative lens. The object side S21 of the first lens L21 is a spherical convex surface, and the image side S22 of the first lens L21 is a spherical concave surface. The second lens L22 is a bi-convex positive lens. The second lens L22 has an object side surface S22 and an image side surface S23, both of which are spherical. The third lens L23 is a meniscus positive lens. The object side S24 of the third lens L23 is a spherical convex surface, and the image side S25 of the third lens L23 is a spherical concave surface. The fourth lens L24 is a meniscus positive lens. The object side S26 of the fourth lens L24 is a spherical convex surface, and the image side S27 of the fourth lens L24 is a spherical concave surface.

The second lens group G22 comprises a fifth lens L25, a sixth lens L26, a seventh lens L27 and an eighth lens L28. The fifth lens L25 is a meniscus negative lens. The object side S28 of the fifth lens L25 is an aspherical convex surface, and the image side S29 of the fifth lens L15 is an aspherical concave surface. The sixth lens L26 is a bi-concave negative lens. The sixth lens L26 has an object side surface S210 and an image side surface S211, and both of which are spherical. The seventh lens L27 is a bi-convex positive lens. The seventh lens L27 has an object side surface S211 and an image side surface S212, and both of which are spherical. The eighth lens L28 is a bi-concave negative lens. The object side S213 of the seventh lens L27 is an aspherical surface, and the image side S214 of the seventh lens L27 is a spherical surface.

The rear lens group $G2_R$ comprises a third lens group G23 having positive refractive power, a fourth lens group G24 having positive refractive power, a fifth lens group G25 having negative refractive power, a sixth lens group G26 and a seventh lens G27.

The third lens group G23 comprises a ninth lens L29 and the ninth lens L29 is a meniscus positive lens. Furthermore, the object side S216 of the ninth lens L29 is an aspherical convex surface, and an image side S217 of the ninth lens L29 is a spherical concave surface.

The fourth lens group G24 comprises a front subgroup $G24_F$ having positive refractive power and a rear subgroup $G24_R$ having negative refractive power. The front subgroup $G24_F$ comprises a tenth lens L210 and an image correction lens. In the second embodiment of the invention, the image correction lens comprises a front image correction lens L211 and a rear image correction lens L212. The tenth lens L210 is a bi-convex positive lens. The tenth lens L210 has an object side surface S218 and an image side surface S219, and both of which are aspherical. The front image correction lens L211 and the rear image correction lens L212 adhere to each other, and are shifted together in a direction transverse to the optical axis OA2 to stabilize a picked-up image when the zoom lens 2 vibrates. The rear subgroup $G24_R$ comprises a thirteenth lens L213 and the thirteenth lens L213 is a meniscus negative lens. The object side S223 of the thirteenth lens L213 is a spherical convex surface, and the image side S224 of the thirteenth lens L213 is a spherical concave surface.

The fifth lens group G25 comprises a fourteenth lens L214 and a fifteenth lens L215. The object side S225 of the fourteenth lens L214 is an aspherical concave surface, and the image side S227 of the fifteenth lens L215 is a spherical convex surface.

The sixth lens group G26 comprises a sixteenth lens L216 and a seventeenth lens L217. The sixteenth lens L216 is a meniscus lens. The object side S228 of the sixteenth lens L216 is a spherical convex surface, and the image side S229 of the sixteenth lens L216 is a spherical concave surface. The seventeenth lens L217 is a bi-convex lens. The object side S230 of the seventeenth lens L217 is an aspherical surface, and the image side S231 of the seventeenth lens L217 is a spherical concave surface.

The seventh lens group G27 comprises an eighteenth lens L218. The eighteenth lens L218 is a meniscus lens. The object side S232 of the eighteenth lens L218 is an aspherical concave surface, and the image side S233 of the eighteenth lens L218 is a spherical convex surface.

The optical filter OF2 is a glass plate. The optical filter OF2 has an object side surface S234 and an image side surface S235, and both of which are plane.

Referring to FIG. 7, FIG. 8 and FIG. 9, when the zoom lens 2 zooms from wide-angle end to telephoto end, the first lens group G21, the fourth lens group G24 and the fifth lens group G25 move toward the object side along the optical axis OA2, and the second lens group G22 moves toward the image side along the optical axis OA2.

In addition, the zoom lens 2 of the second embodiment satisfies the following condition:

$$(1-\beta 2_p) \times \beta 2_r > 2 \qquad (2)$$

Where $\beta2_p$ is a lateral magnification of the image correction lens when the zoom lens 2 is at the telephoto end, and where $\beta2_r$ is a lateral magnification of the lenses in the rear lens group $G2_R$ except for the lenses in front of the image correction lens when the zoom lens 2 is at the telephoto end. In the second embodiment of the invention, $\beta2_r$ is a lateral magnification of the front image correction lens L211, the rear image correction lens L212, the thirteenth lens L213, the fourteenth lens L214, the fifteenth lens L215, the sixteenth lens L216, the seventeenth lens L217 and the eighteenth lens L218.

In accordance with the above design of the second embodiment, the zoom lens 2 has the functions of high zoom ratio and anti-vibration without deteriorating its optical performance.

Referring to TABLE 3, the optical specifications of the zoom lens 2 of the second embodiment at the wide-angle (W), the medium end (M) and the telephoto end (T).

TABLE 3

| Surface | Radius of Curvature (mm) | Thickness (mm) | Nd | Vd | Remark |
|---|---|---|---|---|---|
| S21 | 430.481 | 1.5 | 1.83481 | 42.7238 | The first lens L21 of first lens group G21 |
| S22 | 62.2499 | 6.0022 | 1.497 | 81.5409 | The second lens L22 of first lens group G21 |
| S23 | −230.93 | 0.13 | | | |
| S24 | 104.444 | 2.91674 | 1.497 | 81.5409 | The third lens L23 of first lens group G21 |
| S25 | 575.795 | 0.12 | | | |
| S26 | 50.8615 | 5.34351 | 1.497 | 81.5409 | The fourth lens L24 of first lens group G21 |
| S27 | 510.732 | 0.45 (W)<br>44.52 (M)<br>67.79 (T) | | | |
| S28 | 290.436 | 0.6 | 1.8043 | 40.4169 | The fifth lens L25 of second lens group G22 |
| S29 | 11.6924 | 3.86136 | | | |
| S210 | −22.3189 | 0.8 | 1.883 | 40.7651 | The sixth lens L26 of second lens group G22 |
| S211 | 10.7975 | 3.99247 | 1.8081 | 22.7608 | The seventh lens L27 of second lens group G22 |
| S212 | −25.8078 | 0.27165 | | | |
| S213 | −19.2227 | 1.46155 | 1.53504 | 55.7107 | The eighth lens L28 of second lens group G22 |
| S214 | 100.576 | 33.94 (W)<br>8.78 (M)<br>1.30 (T) | | | |
| S215 | ∞ | 0.7 | | | Stop ST2 |
| S216 | 18.4865 | 2.27677 | 1.53504 | 55.7107 | The ninth lens L29 of third lens group G23 |
| S217 | 33.8909 | 9.90 (W)<br>3.60 (M)<br>0.60 (T) | | | |
| S218 | 29.2747 | 3.92447 | 1.48749 | 70.2362 | The tenth lens L210 of fourth lens group G24 |
| S219 | −22.6338 | 0.3998 | | | |
| S220 | 19.2762 | 3.43833 | 1.58913 | 61.496 | The front image correction lens L211 of fourth lens group G24 |
| S221 | −16.0278 | 0.80008 | 1.84666 | 23.7798 | The rear image correction lens L212 of fourth lens group G24 |
| S222 | −30.6575 | 0.14925 | | | |
| S223 | 38.4307 | 0.69975 | 1.90366 | 31.315 | The thirteenth lens L213 of fourth lens group G24 |
| S224 | 16.4186 | 2.81 (W)<br>14.42 (M)<br>13.53 (T) | | | |
| S225 | −31.6677 | 0.89522 | 1.8043 | 40.4169 | The fourteenth lens L214 of fifth lens group G25 |
| S226 | 8.83481 | 3.32313 | 1.69895 | 30.1279 | The fifteenth lens L215 of fifth lens group G25 |
| S227 | −73.3653 | 1.49 (W)<br>5.32 (M)<br>23.56 (T) | | | |
| S228 | 143.553 | 0.84402 | 1.84666 | 23.7798 | The sixteenth lens L216 of sixth lens group G26 |
| S229 | 30.565 | 0.12996 | | | |
| S230 | 23.518 | 2.80967 | 1.53504 | 55.7107 | The seventeenth lens L217 of sixth lens group G26 |

TABLE 3-continued

| Surface | Radius of Curvature (mm) | Thickness (mm) | Nd | Vd | Remark |
|---|---|---|---|---|---|
| S231 | −16.2118 | 6.67 (W) 7.39 (M) 1.05 (T) | | | |
| S232 | −30.1411 | 1.33 | 1.53504 | 55.7107 | The eighteenth lens L218 of seventh lens group G27 |
| S233 | −107.855 | 2.02763 | | | |
| S234 | ∞ | 0.72 | 1.51633 | 64.142 | Optical filter OF2 |
| S235 | ∞ | 1.0 | | | |

The aspheric surface sag z of each lens in TABLE 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the zoom lens 2 of the second embodiment, the conic constant k and the aspheric coefficients A, B, C, D and E of each surface are shown in TABLE 4.

TABLE 4

| Surface | k | A | B | C | D | E |
|---|---|---|---|---|---|---|
| S28 | −564.827 | −2.1E−08 | 1.3E−11 | 0 | 0 | 0 |
| S29 | −8.37075 | 5.8E−07 | 1.5E−10 | 0 | 0 | 0 |
| S213 | 0 | 1.1E−07 | 2.4E−12 | 0 | 0 | 0 |
| S216 | 0 | 2.9E−09 | −8.1E−14 | 0 | 0 | 0 |
| S218 | 0 | 7.4E−09 | 0 | 0 | 0 | 0 |
| S219 | 0 | 1.4E−08 | 0 | 0 | 0 | 0 |
| S220 | 0 | 1E−10 | −1.7E−13 | 0 | 0 | 0 |
| S225 | 0 | −1.1E−08 | 0 | 0 | 0 | 0 |
| S230 | 0 | 1.5E−07 | 0 | 0 | 0 | 0 |
| S232 | 0 | −1.7E−07 | 0 | 0 | 0 | 0 |

For the zoom lens 2 of the second embodiment, the $\beta 2_p$ is 0.248, the $\beta 2_r$ is 3.34. According to the above data, the following values can be obtained: $(1-\beta 2_p) \times \beta 2_r = 2.51$, which satisfy the above condition (2).

In addition, it is obvious that the longitudinal aberration, the field curvature, the distortion and the lateral color of the zoom lens 2 of the second embodiment at the wide-angle, the medium end and the telephoto end (the accompanying drawings of the second embodiment are omitted because that is similar to the accompanying drawings of the first embodiment) can be corrected effectively, thereby capable of obtaining good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens, in sequence from an object side to an image side along an optical axis, comprising:
    a first lens group having positive refractive power;
    a second lens group having negative refractive power;
    a stop; and
    a rear lens group having positive refractive power and comprising a third lens group, a fourth lens group having positive refractive power and comprising an image correction lens which is shifted in a direction transverse to the optical axis to stabilize a picked-up image when the zoom lens vibrates, and a fifth lens group having negative refractive power;
    wherein the zoom lens satisfies the following condition: $2 < (1-\beta_p) \times \beta_r < 3$, where $\beta_p$ is a lateral magnification of the image correction lens when the zoom lens is at a telephoto end, and where $\beta_r$ is a lateral magnification of the lenses in the rear lens group except for the lenses in front of the image correction lens when the zoom lens is at the telephoto end.

2. The zoom lens as claimed in claim 1, wherein the image correction lens is with positive refractive power, wherein the image correction lens moves in a direction perpendicular to the optical axis in order to correct an image position when the zoom lens is shooting, wherein the fourth lens group further comprises a thirteenth lens, the thirteenth lens of the fourth lens group is located in the back of the image side of the image correction lens, and the thirteenth lens of the fourth lens group is with negative refractive power.

3. The zoom lens as claimed in claim 1, wherein the fourth lens group further comprises a tenth lens and a thirteenth lens, the tenth lens of the fourth lens group is with positive refractive power, the tenth lens of the fourth lens group is located in front of the object side of the image correction lens, the thirteenth lens of the fourth lens group is with negative refractive power, the thirteenth lens of the fourth lens group is located in the back of the image side of the image correction lens, and the image correction lens is with positive refractive power.

4. The zoom lens as claimed in claim 1, wherein the zoom lens further satisfies the following condition: $2 < (1-\beta_p) \times \beta_r \leq 2.51$, where $\beta_p$ is a lateral magnification of the image correction lens when the zoom lens is at the telephoto end, and where $\beta_r$ is a lateral magnification of the lenses in the rear lens group except for the lenses in front of the image correction lens when the zoom lens is at the telephoto end.

5. The zoom lens as claimed in claim 1, wherein the zoom lens further comprises a sixth lens group disposed between the fifth lens group and the image side, and the sixth lens group is with positive refractive power.

6. The zoom lens as claimed in claim 5, wherein the zoom lens further comprises a seventh lens group disposed between the sixth lens group and the image side.

7. A zoom lens, in sequence from an object side to an image side along an optical axis, comprising:
    a first lens group having positive refractive power and comprising a first lens having negative refractive power, a second lens having positive refractive power, a third lens having positive refractive power and a fourth lens having positive refractive power;

a second lens group having negative refractive power and comprising a fifth lens having negative refractive power, a sixth lens having negative refractive power, a seventh lens having positive refractive power and an eighth lens having negative refractive power;

a stop;

a third lens group having positive refractive power and comprising a ninth lens having positive refractive power;

a fourth lens group comprising a front subgroup having positive refractive power and a rear subgroup having negative refractive power;

a fifth lens group having negative refractive power; and a sixth lens group; wherein, when the zoom lens zooms from a wide-angle end to a telephoto end, the first lens group and the fourth lens group move toward the object side along the optical axis, and the second lens group moves toward the image side along the optical axis.

8. The zoom lens as claimed in claim 7, wherein the fourth lens group further comprises an image correction lens which is shifted in a direction transverse to the optical axis to stabilize a picked-up image when the zoom lens vibrates; wherein the zoom lens satisfies the following condition: $2<(1-\beta_p)\times\beta_r<3$, where $\beta_p$ is a lateral magnification of the image correction lens when the zoom lens is at the telephoto end, and where $\beta_r$ is a lateral magnification of the lenses behind the stop except for the lenses in front of the image correction lens when the zoom lens is at the telephoto end.

9. The zoom lens as claimed in claim 8, wherein the fourth lens group further comprises a thirteenth lens, the thirteenth lens of the fourth lens group is located in the back of the image side of the image correction lens, and the thirteenth lens of the fourth lens group is with negative refractive power.

10. The zoom lens as claimed in claim 9, wherein the fifth lens group moves toward the image side along the optical axis when the zoom lens focuses subject at close range.

11. The zoom lens as claimed in claim 7, wherein the fourth lens group further comprises an image correction lens which is shifted in a direction transverse to the optical axis to stabilize a picked-up image when the zoom lens vibrates; wherein the zoom lens further satisfies the following condition: $2<(1-\beta_p)\times\beta_r\leq2.51$, where $\beta_p$ is a lateral magnification of the image correction lens when the zoom lens is at the telephoto end, and where $\beta_r$ is a lateral magnification of the lenses behind the stop except for the lenses in front of the image correction lens when the zoom lens is at the telephoto end.

12. The zoom lens as claimed in claim 7, wherein the sixth lens group is with positive refractive power.

13. The zoom lens as claimed in claim 12, wherein the zoom lens further comprises a seventh lens group disposed between the sixth lens group and the image side.

14. A zoom lens, in sequence from an object side to an image side along an optical axis, comprising:

a first lens group having positive refractive power and comprising a first lens having negative refractive power, a second lens having positive refractive power, a third lens having positive refractive power and a fourth lens having positive refractive power;

a second lens group having negative refractive power and comprising a fifth lens having negative refractive power, a sixth lens having negative refractive power, a seventh lens having positive refractive power and an eighth lens having negative refractive power;

a stop; and a rear lens group having positive refractive power and comprising a third lens group, a fourth lens group having positive refractive power and comprising an image correction lens which is shifted in a direction transverse to the optical axis to stabilize a picked-up image when the zoom lens vibrates, and a fifth lens group having negative refractive power;

wherein the zoom lens satisfies the following condition: $2<(1-\beta_p)\times\beta_r<3$, where $\beta_p$ is a lateral magnification of the image correction lens when the zoom lens is at a telephoto end, and where $\beta_r$ is a lateral magnification of the lenses in the rear lens group except for the lenses in front of the image correction lens when the zoom lens is at the telephoto end.

* * * * *